United States Patent
Matsuda

(10) Patent No.: US 7,130,078 B2
(45) Date of Patent: Oct. 31, 2006

(54) IMAGE FORMING DEVICE AND METHOD FOR CONTROLLING THE SAME

(75) Inventor: Yoji Matsuda, Fujisawa (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 905 days.

(21) Appl. No.: 10/022,527

(22) Filed: Dec. 20, 2001

(65) Prior Publication Data

US 2003/0184780 A1    Oct. 2, 2003

(51) Int. Cl.
*G06F 15/00* (2006.01)

(52) U.S. Cl. ............... 358/1.9; 358/1.11; 358/1.16

(58) Field of Classification Search ........... 358/1.11, 358/1.16, 1.9
See application file for complete search history.

(56) References Cited

U.S. PATENT DOCUMENTS

RE34,835 E  *  1/1995 Ozeki .................. 345/594
6,281,983 B1 *  8/2001 Takahashi et al. ....... 358/1.2

FOREIGN PATENT DOCUMENTS

| JP | 8-147123 | | 6/1996 |
|---|---|---|---|
| JP | 09-193501 | * | 7/1997 |
| JP | 9-193511 | | 7/1997 |
| JP | 09-305576 | * | 11/1997 |
| JP | 9-305576 | | 11/1997 |

* cited by examiner

*Primary Examiner*—Kimberly Williams
*Assistant Examiner*—Michael Burleson
(74) *Attorney, Agent, or Firm*—Foley & Lardner LLP

(57) ABSTRACT

A device-information-holding section holds inherent device information including the control information to be possessed by an image-forming device. A condition-setting section sets a reference value to specific device information in the above device information as a condition. A character-data-generating section determines whether the device information fetched from the device-information-holding section meets the above set condition, adds predetermined color information to the device information in accordance with the determination result, and converts the device information into character-string data. An image-data-generating section converts the above converted character-string data into character-image data. An image-data-storing section stores the above converted character-image data. An image-forming section reads the character-image data from the image-data-storing section and forms an image based on the character-image data on an image-recording medium. The image-forming section has a function for printing out the specific device information by coloring or character-modifying the information under a specific condition.

20 Claims, 17 Drawing Sheets

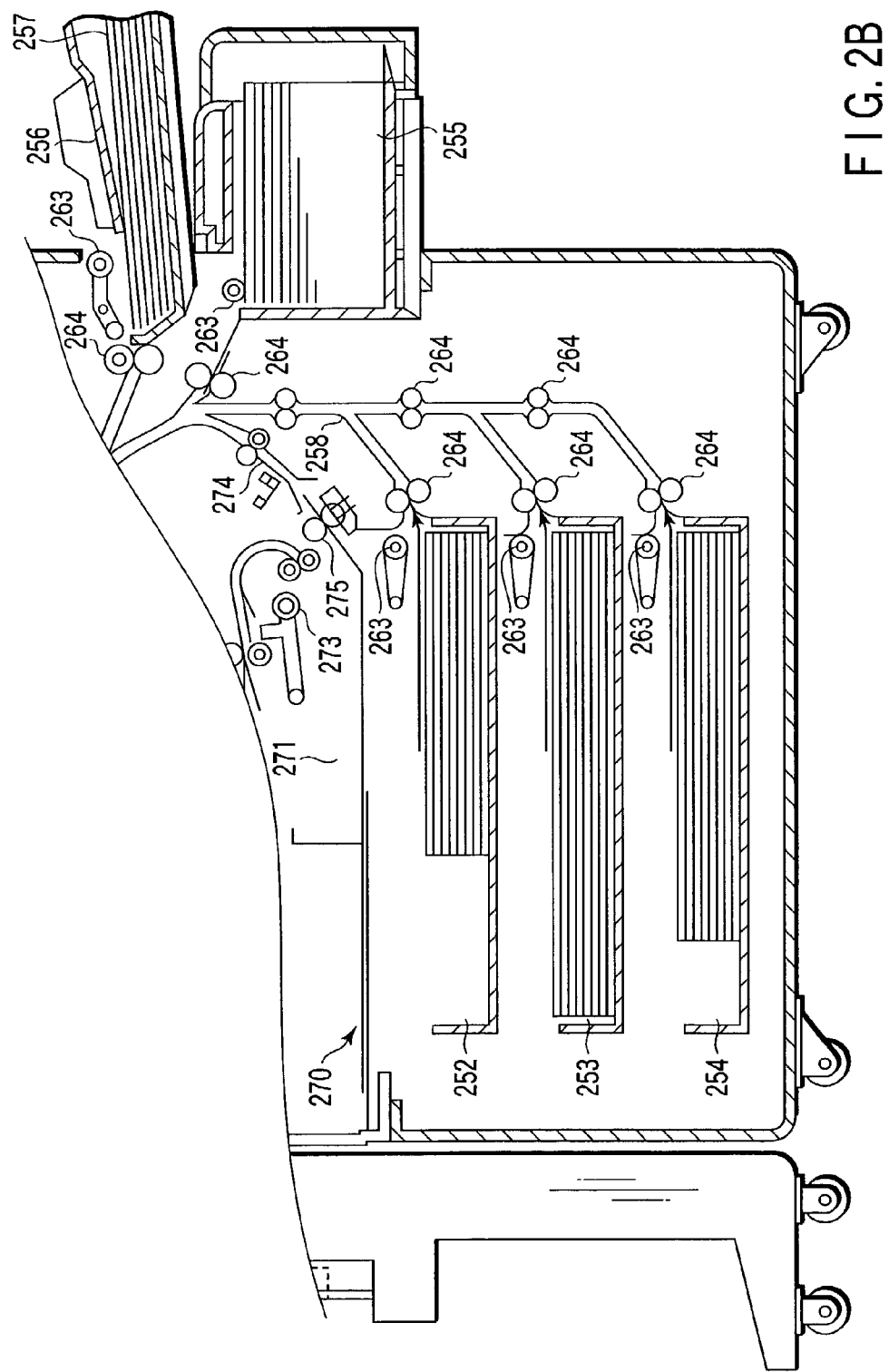
F I G. 2B

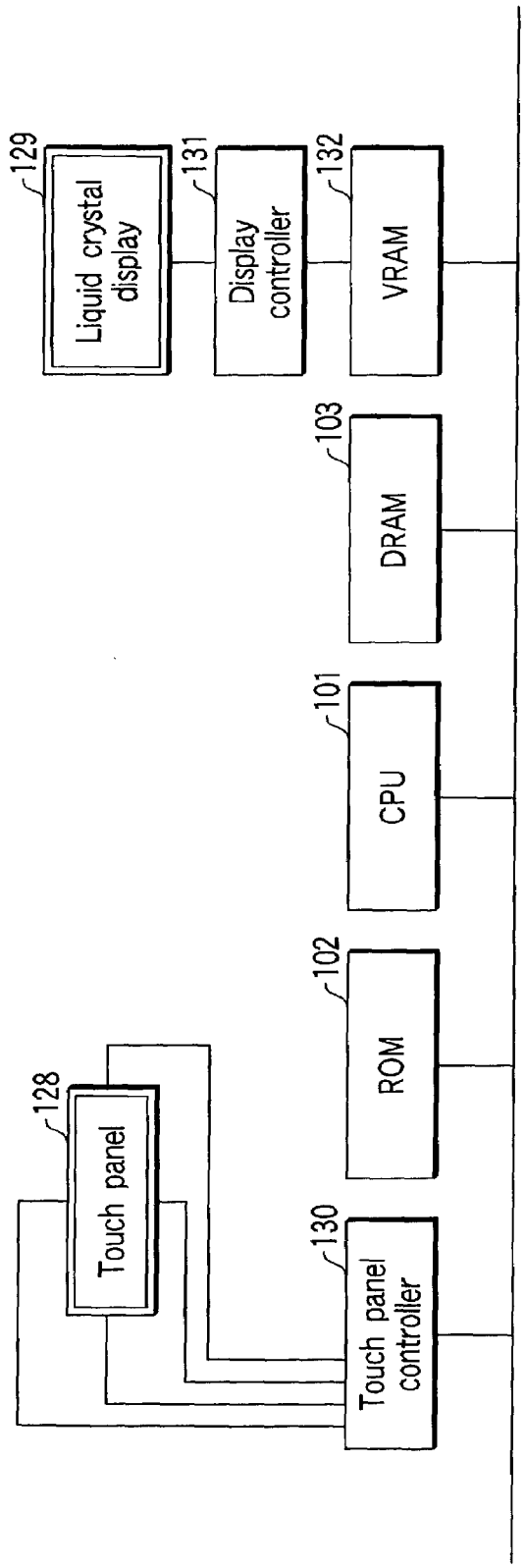
F I G. 5

| Sector name | Number of copies COLOR | Number of copies BK | Number of prints COLOR | Number of prints BK |
|---:|---:|---:|---:|---:|
| 1 | 200 | 1200 | 100 | 2200 |
| 2 | 90 | 4500 | 104 | 300 |
| 3 | 200 | 3002 | 2200 | 500 |
| 4 | 190 | 300 | 1900 | 3100 |
| 5 | -1 | -1 | -1 | -1 |
| ⋮ | ⋮ | ⋮ | ⋮ | ⋮ |
| 998 | -1 | -1 | -1 | -1 |
| 999 | -1 | -1 | -1 | -1 |

```
aBUF = {
    "0x0A",
    "     USER, C0, INFORMATION, C0",
    "0x0A",
    "                         Copy (Color/BK), C0,        Print (Color/BK), C0",
    "0x0A",
    "   SECTION 1, C0,    200, C0,/, C0, 1290, C0     1000, C0,/, C0, 2200, C1",
    "0x0A",
    "   SECTION 2, C0,    090, C0,/, C0, 4500, C0     104, C0,/, C0, 300, C0",
    "0x0A",
    "   SECTION 3, C0,    200, C1,/, C0, 3002, C2     2200, C1,/, C0, 500, C0",
    "0x0A",
    "   SECTION 4, C0,    200, C1,/, C0, 300, C0      1900, C0,/, C0, 3100, C2",
    "0x0A",
    "LFLFLF"};

aData [8] [2] = {
    C0, 0x00110101,    /* Black           */
    C1, 0x01010011,    /* Red             */
    C2, 0x01000001,    /* Blue            */
    C3, 0x01110100,    /* Yellow          */
    C4, 0x10000001,    /* Green           */
    C5, 0x11000010,    /* Purple          */
    C6, 0x11100100,    /* Yellowish green */
    C7, 0x11111000,    /* Pink            */
    };
```

F I G. 15

User information

|  | Copy (Color/BK) | Print (Color/BK) |
|---|---|---|
| Section 1 | 200 / 1290 | 1000 / <u>2200</u> ⁀"Red" |
| Section 2 | 090 / 450 | 104 / 300 |
| Section 3 | "Red"⁀ <u>200</u> / <u>3002</u> ⁀"Blue" | "Red"⁀ <u>2200</u> / 500 |
| Section 4 | "Blue"⁀ <u>190</u> / 300 | 1900 / <u>3100</u> ⁀"Blue" |

FIG. 16

IMAGE FORMING DEVICE AND METHOD FOR CONTROLLING THE SAME

BACKGROUND OF THE INVENTION

1. Field of the Invention

The present invention relates to an image-forming device and a method for controlling the device, particularly to an image-forming device such as a digital color copying machine having a function for applying specific character modification to a specific item in accordance with a condition previously designated by a user when printing out machine control information or operator information and a method for controlling the device.

2. Description of the Related Art

In the case of a digital color-copying machine, it is conventionally executed to print out machine control information or operation information in the form of a list or report.

In this case, a list or report is printed out as color characters for error communication as disclosed in Jpn. Pat. Appln. KOKAI Publication Nos. 9-193511 and 9-193501, or it is colored in accordance with a base color as disclosed in Jpn. Pat. Appln. KOKAI Publication No. 8-147123.

However, these prior arts do not print out a specific item among items to be printed out by using an inherent color or character modification.

That is, in the case of a conventional digital color copying machine, it is not executed to print out a specific item by coloring it with a specific color in accordance with a specific condition or applying character modification to the item when printing out device information in the form of a list or report.

When using one digital color copying machine by a plurality of sections in common and printing out the control information for the number of copies or the number of prints for each section, it must greatly improve the operability from the viewpoint of extraction of control information to print out a specific item desired by a user by designating a modification method for a character color or the like in accordance with a specific condition designated by the user.

In the case of the above prior art, however, a user cannot print out a specific item desired by the user by designating a modification method for a character color in accordance with a specific condition designated by the user when printing out the control information for the number of copies or the number of prints to used by sections in common. Therefore, there is a problem that the operability is not preferable for a user from the viewpoint of extraction of a specific item from machine control information.

BRIEF SUMMARY OF THE INVENTION

The present invention is made to solve the above problems and its object is to provide an image-forming device and a method for controlling the device, which make it possible for a user to print out the information particularly noted by the user by designating a modification method in accordance with a condition desired by the user when printing out machine control information or operator information in the from of a list or report.

To achieve the above object, a first aspect of the present invention provides an image-forming device comprising:

a device-information-holding module which holds inherent device information including control information to be possessed by the image-forming device;

a condition-setting module which sets a reference value to specific device information of the above device information as a condition;

a character-data-generating module which fetches the device information from the device-information-holding module, determining whether the device information meets the condition set by the condition-setting module, adding predetermined color information to the device information in accordance with the determination result, and converting the device information including the predetermined color information into character-string data;

an image-data-generating module which converts the character-string data converted by the character-data-generating module into character-image data;

an image-data-storing module which stores the character-image data converted by the image-data-generating module; and an image-forming module which reads the character-image data from the image-data-storing module and forming an image based on the character-image data on an image-recording medium, wherein the image-forming module has a function for applying coloring or character modification to the specific device information under a specific condition and printing out the information when printing out the above device information.

According to the first aspect of the present invention, it is possible to easily extract the information intended by a user when printing out a list or report in accordance with the data output from the image-forming device.

Moreover, a second aspect of the present invention provides the image-forming device according to the first aspect and further comprising a user interface for displaying a condition to be set by the condition-setting module.

According to the second aspect of the present invention, it is possible to easily extract the information intended by a user when printing out a list or report in accordance with the data output from the image-forming device.

Furthermore, a third aspect of the present invention provides the image-forming device of the first aspect, in which the image-forming module has a function for printing out the character-image data by coloring or modifying the character-image data in accordance with preset conditions when printing out the device information.

According to the third aspect of the present invention, it is possible to easily extract the information intended by a user when printing out a list or report in accordance with the data output from the image-forming device.

Furthermore, a fourth aspect of the present invention provides the image-forming device according to the first aspect, in which the image-data-generating module has a function for determining whether an item designated by a user meets a condition designated by a user when generating a number-of-sheet-used-information list or report every user group, coloring the item with a color designated by a user or applying character-string modification to the item by a modification method designated by the user to generate character-image data when the item meets the condition, and the image-forming module has a function for coloring the character-image data with a color designated by the user or applying character-string modification to the list or report by a modification method designated by the user and printing out character-image data.

According to the fourth aspect of the present invention, it is possible to easily extract information intended by a user when printing out a section control information or the like in accordance with the data output from the image-forming device.

Furthermore, a fifth aspect of the present invention provides the image-forming device according to the first aspect, in which the image-data-generating module has a function for generating character-image data by applying respectively-inherent character modification to the specific device information under a plurality of conditions, and the image-forming module has a function for generating character-image data by applying respectively-inherent character modification to the specific device information or specific control information under a plurality of conditions.

According to the fifth aspect of the present invention, it is possible to extract more information intended by a user when printing out a list or report in accordance with the data output from the image-forming device.

Furthermore, a sixth aspect of the present invention provides the image-forming according to the first aspect, in which the image-forming module has a function for stepwise coloring each of the character-image data values with an inherent color about one item and printing out the data correspondingly to a preset number of conditions when printing out the device information.

According to the sixth aspect of the present invention, it is possible to easily extract more complex information intended by a user when printing out a list or report in accordance with the data output from the image-forming device.

Furthermore, a seventh aspect of the present invention provides the image-forming according to the first aspect in which the image-data-generating module has a function for determining whether to meet any stage of a plurality of conditions designated by a user about one item designated by the user when generating a number-of-sheet-used-information list or report every user group and generating character-image data by coloring the data with a color designated by the user in accordance with a stage meeting one of the conditions, and the image-forming module has a function for printing out the character-image data by coloring the data with a color designated by the user in accordance with a stage meeting one of the conditions.

According to the seventh aspect of the present invention, it is possible to extract the information intended by a user at a plurality of stages when printing out the section control information or a report in accordance with the data output from the image-forming device.

To achieve the above objects, an eighth aspect of the present invention provides an image-forming device comprising:

device-information-holding means for holding inherent device information including control information to be possessed by the image-forming device;

condition-setting means for setting the reference value of specific device information in the above device information as a condition;

character-data-generation means for fetching the device information from the device-information-holding means, determining whether the device information meets the condition set by the condition-setting means, adding predetermined color information to the device information in accordance with the determination result, and converting the device information including the predetermined color information into character-string data;

image-data-generating means for converting the character-string data converted by the character-data-generating means into character-image data;

image-data-storing means for storing the character-image data converted by the image-data-generating means; and image-forming means for reading the character-image data from the image-data-storing means and forming an image based on the character-image data on an image-recording medium, wherein the image-forming means has a function for printing out the device information by coloring or character-modifying the specific device information under a specific condition when printing the above device information.

According to the eighth aspect of the present invention, it is possible to easily extract the information intended by a user when printing out a list or report in accordance with the data output from the image-forming device.

Furthermore, a ninth aspect of the present invention provides the image-forming according to the eighth aspect and further comprising a user interface for displaying a condition to be set by the above condition-setting means.

According to the ninth aspect of the present invention, it is possible to easily extract the information intended by a user when printing out a list or report in accordance with the data output from the image-forming device.

Furthermore, a tenth aspect of the present invention provides the image-forming according to the eighth aspect, in which the image-forming means has a function for printing out the above character-image data by coloring or modifying the data in accordance with preset conditions when printing out the above device information.

According to the tenth aspect of the present invention, it is possible to easily extract the information intended by a user when printing out a list or report in accordance with the data output from the image-forming device.

Furthermore, an eleventh aspect of the present invention provides the image-forming according to the eighth aspect, in which the image-data-generating means has a function for determining whether an item designated by a user meets a condition designated by the user when generating a number-of-sheets-used-information list or report every user group and when the item meets the condition, generating character-image data by coloring the item with a color designated by the user or applying character-string modification to the item in accordance with a modification method designated by the user, and the image-forming means image-forming means has a function for printing out the character-image data generated by the image-data-generating means by coloring the character-image data with a color designated by the user or applying character-string modification to the data in accordance with a modification method designated by the user.

According to the eleventh aspect of the present invention, it is possible to easily extract the information intended by a user when printing out a section control information report or the like in accordance with the data output from the image-forming device.

Furthermore, a twelfth aspect of the present invention provides the image-forming device of the eighth aspect, in which the image-data-generating means has a function for generating character-image data by applying respectively-inherent character modification to the specific device information under a plurality of conditions, and the image-forming means has a function for printing out character-image data by applying respectively-inherent character modification to the specific device information or the specific control information under a plurality of conditions.

According to the twelfth aspect of the present invention, it is possible to extract more information intended by a user when printing out a list or report in accordance with the data output from the image-forming device.

Furthermore, a thirteenth aspect of the present invention provides the image-forming according to the eighth aspect, in which the image-forming means has a function for printing out the device information by stepwise coloring the character-image data with a respectively-inherent color in accordance with a plurality of preset conditions about one item.

According to the thirteenth aspect of the present invention, it is possible to easily extract more information intended by a user when printing out a list or report in accordance with the data output from the image-forming device.

Furthermore, a fourteenth aspect of the present invention provides the image-forming according to the eighth aspect, in which the image-data-generating means has a function for determining whether to meet any stage of a plurality of conditions designated by a user about one item designated by the user when generating a number-of-sheet-used-information list or report every user group and generating character-image data by coloring the data with a color designated by the user in accordance with a stage meeting one of the conditions, and the image-forming means has a function for printing out the character-image data by coloring the data with a color designated by the user in accordance with a stage meeting one of the conditions.

According to the fourteenth aspect of the present invention, it is possible to extract the information intended by a user at a plurality of stages when printing out a section-control-information report or the like in accordance with the data output from the image-forming device.

To achieve the above object, the fifteenth aspect of the present invention provides a method for controlling an image-forming device, comprising:

holding inherent device information including the control information to be possessed by the image-forming device;

setting a reference value to specific device information of the above device information as a condition;

fetching the device information, determining whether the device information meets the above condition, adding predetermined color information to the device information in accordance with the determination result, and converting the device information including the predetermined color information into character-string data;

converting the character-string data into character-image data;

storing the character-image data in a memory; and reading character-image data from the memory and forming an image based on the character-image data on an image-recording medium, wherein the image formation is performed by applying coloring or character modification to the specific device information under a specific condition and printing out data.

According to the fifteenth aspect of the present invention, it is possible to simplify information extraction intended by a user when printing out a list or report in accordance with the data output from the image-forming device.

Furthermore, a sixteenth aspect of the present invention provides the method for controlling an image-forming according to the fifteenth aspect, in which the image formation is performed by printing out the device information by coloring or modifying the character-image data in accordance with a preset condition.

According to the sixteenth aspect of the present invention, it is possible to extract the information intended by a user when printing out a list or report in accordance with the data output from the image-forming device.

Furthermore, a seventeenth aspect of the present invention provides the method for controlling an image-forming according to the fifteenth aspect, in which the above image-data generation is performed by determining whether an item designated by a user meets a condition designated by the user when generating a number-of-sheets-used-information list or report every user group and, generating character-image data by coloring the data with a color designated by the user or applying character-string modification to the data in accordance with a modification method designated by the user when meeting the condition, and the image formation is performed printing out character-image data generated by coloring the data with a color designated by the user or applying character-string modification to the data by a modification method designated by the user.

According to the seventeenth aspect of the present invention, it is possible to easily extract the information intended by a user when printing out a section-control-information report or the like in accordance with the data output from the image-forming device.

Furthermore, an eighteenth aspect of the present invention provides the method for controlling an image-forming device according to the fifteenth aspect, in which the image-data generation is performed by generating character-image data by applying respectively-inherent character modification to the specific device information under a plurality of conditions, and the image formation is performed by printing out character-image data generated by applying respectively-inherent character modification to the specific device information under a plurality of conditions.

According to the eighteenth aspect of the present invention, it is possible to extract more information intended by a user when printing out a list or report in accordance with the data output from the image-forming device.

Furthermore, a nineteenth aspect of the present invention provides the method for controlling an image-forming device according to the fifteenth aspect in which the image formation is performed by printing out the character-image data by stepwise coloring the data with a respectively-inherent color in accordance with a plurality of preset conditions.

According to the nineteenth aspect of the present invention, it is possible to simplify complex information extraction intended by a user when printing out a list or report in accordance with the data output from the image-forming device.

Furthermore, a twentieth aspect of the present invention provides the method for controlling an image-forming device according to the fifteenth aspect, in which the image-data generation is performed by determining whether to meet any stage of a plurality of conditions designated by a user about an item designated by the user when generating a number-of-sheets-used-information list or report every user group and generates character-image data by coloring the data with a color designated by the user in accordance with a stage meeting one of the conditions, and the image formation is performed by printing out the character-image data generated by coloring the data with a color designated by the user in accordance with a stage meeting one of the above conditions.

According to the twentieth aspect of the present invention, it is extract information in the plural stages intended by a user when printing out a section control information report in accordance with the data output from the image-forming device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention.

FIGS. 2A and 2B are schematic views showing an internal configuration of the composite-type image-forming device in FIG. 1;

FIG. 5 is a block diagram showing a configuration of the touch-panel display of the operation panel in FIG. 4;

FIG. 15 is an illustration showing an embodiment of formatted list data in an image-forming device of the present invention; and FIG. 16 is an illustration showing a printing result in an image-forming device of the present invention.

DETAILED DESCRIPTION OF THE INVENTION

Figure 1:
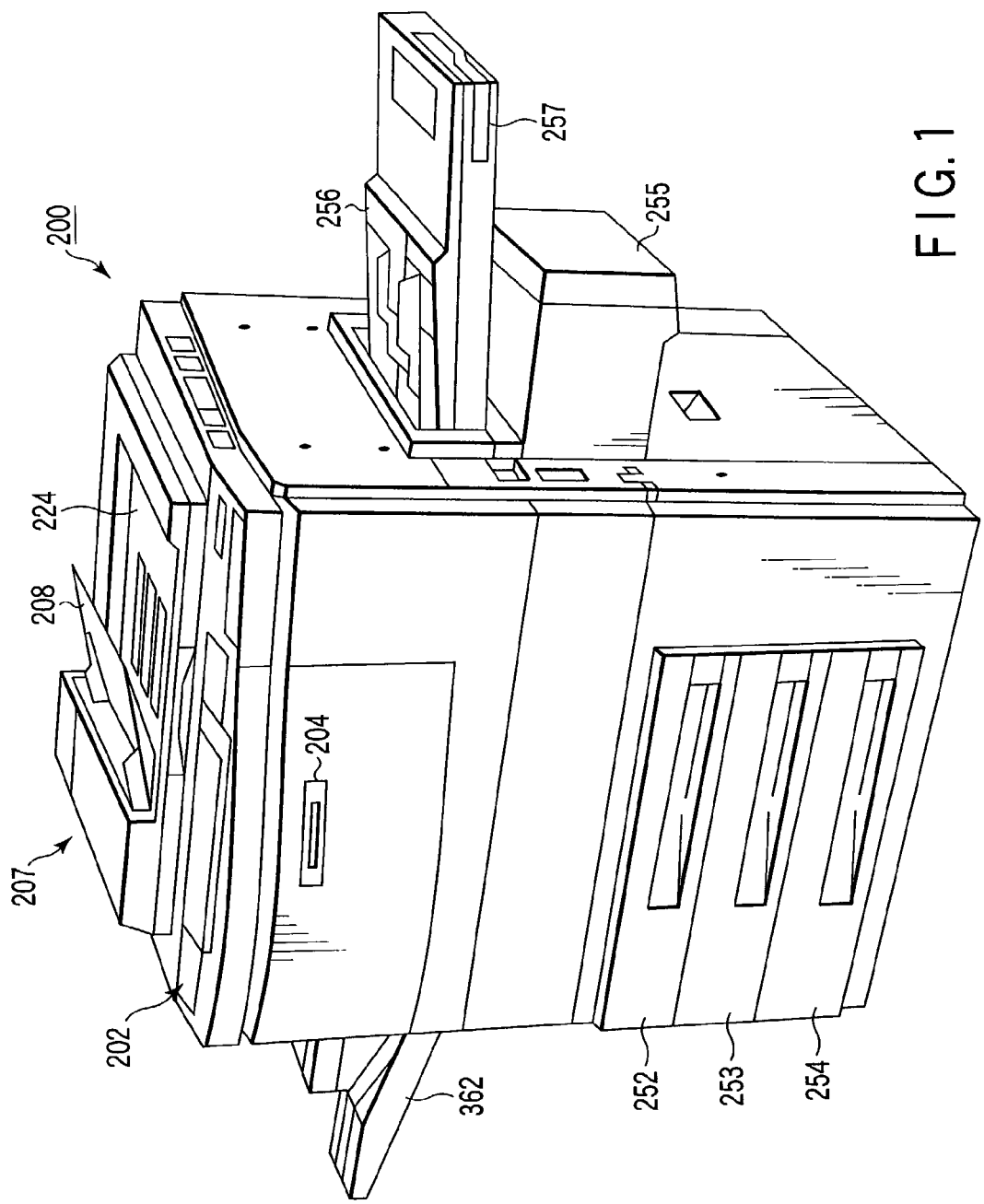
FIG. 1 is a perspective view showing an appearance of a composite-type image-forming device (multifunction-type copying device) of one embodiment of the present invention.

Reference will now be made in detail to the presently preferred embodiments of the invention as illustrated in the accompanying drawings, in which like reference numerals designate like or corresponding parts.

Embodiments of the present invention are described below by referring to the accompanying drawings.

FIG. 1 is a perspective view showing an appearance of a composite-type image-forming device (multifunction-type copying machine) of an embodiment of the present invention.

That is, as shown in FIG. 1, an automatic document feeder (hereafter referred to as ADF) 207 for automatically feeding sheet-like documents one by one and also serving as a document cover is set on a device body 200 so that it can be opened and closed.

Moreover, an operation panel 202 provided with various operation keys for designating copying conditions and start of copying and various indicators is provided at the upper front of the device body 200.

The operation panel 202 will be described later in detail.

Moreover, a sheet-feeding cassette 257 capable of housing a small number of sheets and a large sheet-feeding cassette capable of housing a large number of sheets are removably set to the right side of the device body 200.

The sheet-feeding cassette 257 is provided with a manual tray 256 for manually feeding sheets.

Moreover, sheet-feeding cassettes 252, 253, and 254 are provided for the lower portion of the device body 200.

Same-size sheets are housed in these sheet-feeding cassettes in transverse and longitudinal directions so that the transverse- and longitudinal-directional sheets are selected according to necessity.

Moreover, a sheet-ejecting tray 362 for catching copied sheets is provided for the left side of the device body 200.

Furthermore, an inserting port 204 through which a photomagnetic disk serving as a storage medium for storing image data or the like is inserted is provided for the lower portion of the operation panel 202 at the front of the device body 200 and a photomagnetic disk drive (not illustrated) is provided in the device body 200 opposite the inserting port 204.

Furthermore, a parallel port (not illustrated), a serial port (not illustrated) and a SCSI (refer to FIG. 3) are provided at the back of the device body 200.

In this case, the parallel port connects the present device to an external device, such as a PC, (personal computer) when the present image-forming device operates as a printer.

Moreover, the serial port connects the present image-forming device to an external device, such as a PC, in order to read the internal control information of the present image-forming device and set functions of the present image-forming device when the present image-forming device is maintained.

Furthermore, the SCSI allows command/data communication between the present image-forming device and an external controller operating as a master.

Figure 2A:
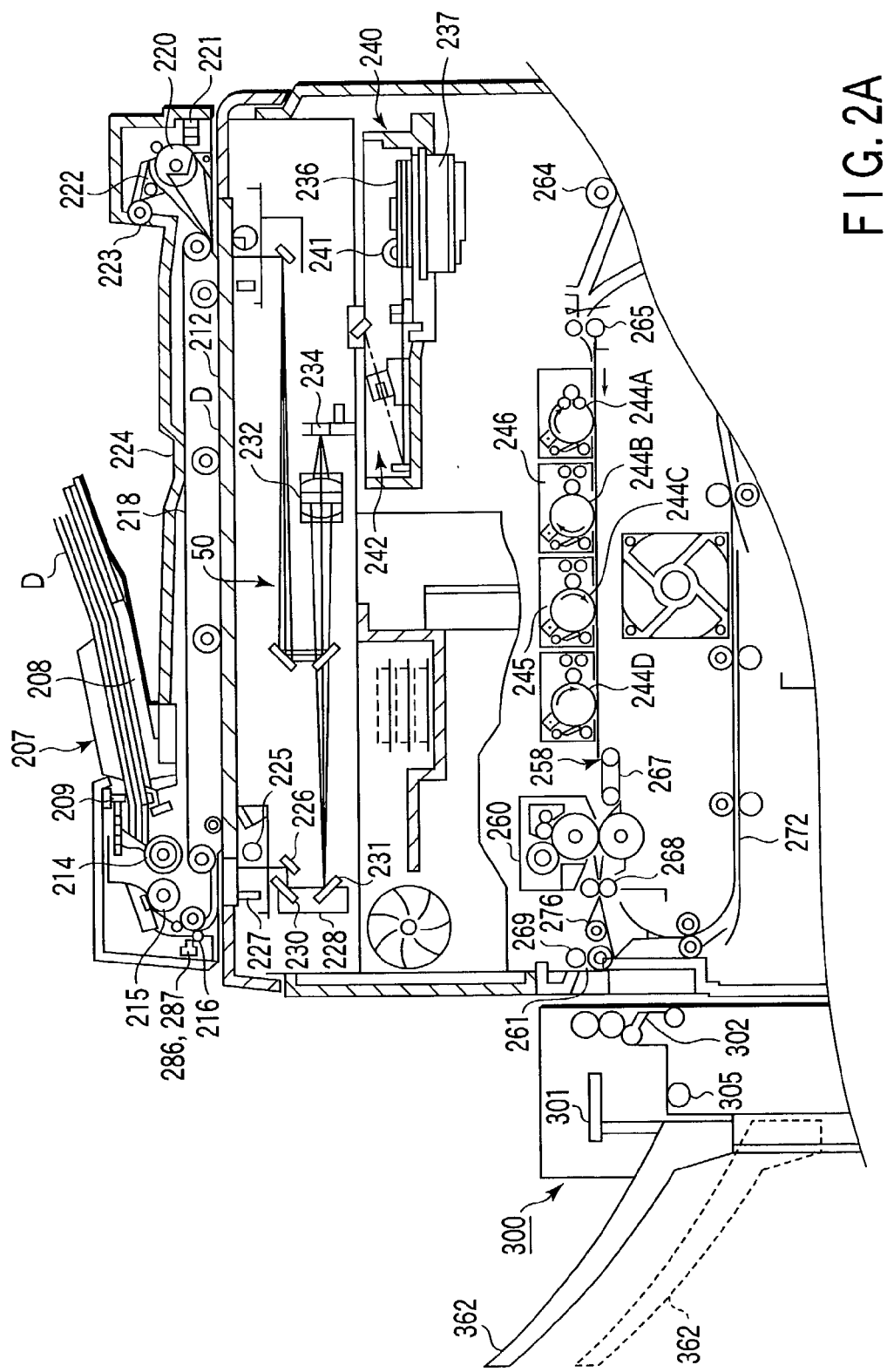

FIGS. 2A and 2B are schematic views showing the internal configuration of the composite-type image-forming device in FIG. 1.

A scanner section 50 serving as obtaining means for obtaining image data and a printer section 52 serving as image-forming means are provided in the device body 200 in order to realize a copying function and a facsimile function.

Moreover, a read object, that is, a document-mounting table 212 made of transparent glass on which a document D is mounted and an ADF 207 for automatically feeding a document onto the document-mounting table 212 are arranged on the upper face of the device body 200.

The ADF 207 is set on the document-mounting table 212 so that it can be opened and closed and also functions as a document holder for bringing the document D mounted on the document-mounting table into close contact with the document-mounting table 212.

Moreover, the ADF 207 is provided with a document tray 208 to which the document D is set, an empty sensor 209 for detecting presence or absence of a document, pickup roller 214 for taking out documents from the document tray one by one, a sheet-feeding roller 215 for carrying a taken-out document, an aligning-roller pair 216 for arranging front ends of documents, an aligning sensor 286 provided for the upstream side of the aligning-roller pair to detect arrival of a document, a side sensor 287 for detecting the size of the document D, and a carrying belt 218 set so as to almost cover the whole of the document-mounting table 212.

Moreover, a plurality of documents set on the document tray 208 by being turned upward are taken out from the page immediately under the documents, that is, from the final page, arranged by the aligning roller pair 212, and carried to a predetermined position of the document-mounting table 212 by the carrying belt 218.

Furthermore, a reversing roller 220, non-reversing roller 221, a flapper 222, and a sheet-feed roller 223 are arranged at the end of the ADF 207 opposite the aligning-roller pair 216 at the both side of the carrying belt 218.

The document D from which image information is read by the scanner section 50 to be described later is delivered from the document-mounting table 212 by the carrying belt 218 and ejected onto a document-ejecting section 224 on the upper face of the ADF 207 through the reversing roller 220, flapper 221, and sheet-ejecting roller 222.

Moreover, when reading the back of the document D, the document D carried by the carrying belt 218 is reversed by the reversing roller 220 by changing the flappers 222 and then, sent to a predetermined position on the document-mounting table 212 by the carrying belt 218 again.

The ADF 207 is provided with a sheet-feeding motor for driving the pickup roller 214, sheet-feed roller 215, and aligning-roller pair 216 and a carrying motor for driving the carrying belt 218, reversing roller 220, and sheet-feed roller 223.

Moreover, the scanner section 50 set in the device body 200 has a light source 225 such as a fluorescent lamp for illuminating the document D mounted on the document-mounting table 212 and a first mirror 226 for deflecting the light reflected from the document D in a predetermined direction.

The light source 225 and first mirror 226 are set to a first carriage 227 set below the document-mounting table 212.

A size sensor (not illustrated) for detecting the size of a document mounted on the document-mounting table 212 is set on the first carriage 216.

In this case, the first carriage 227 is set so as to be movable in parallel with the document-mounting table 212 and reciprocated below the document-mounting table by a driving motor through a not-illustrated toothed belt or the like.

Moreover, a second carriage 228 is set below the document-mounting table 212 so as to be movable in parallel with the document-mounting table 212.

Second and third mirrors 230 and 231 for successively deflecting the light deflected by the first mirror 226 and reflected from the document D are set to the second carriage 228 so as to be perpendicular to each other.

The second carriage 228 is driven by the first carriage 227 by a toothed belt or the like and is moved along the document-mounting table 212 at half the speed of the first carriage, in parallel with the first carriage 227.

Moreover, an imaging lens 232 for converging the light reflected from the third mirror 232 on the second carriage 228 and a CCD sensor 234 for receiving and photoelectrically converting the reflected light converged by the imaging lens 232 are arranged below the document-mounting table 212.

The imaging lens 232 is movably set in a plane including the optical axis of the light deflected by the third mirror 231 through a driving mechanism to image reflected light at a desired magnification in accordance with self movement.

Moreover, the CCD sensor 234 photoelectrically converts the incoming reflected light and outputs an electrical signal corresponding to the read document D.

Furthermore, the printer section 52 is provided with a laser aligner 240 serving as exposure means.

The laser aligner 240 is provided with a semiconductor laser 241 serving as a light source, a polygon mirror 236 serving as a scanning member for continuously deflecting a laser beam emitted from the semiconductor laser 241, a polygon motor 237 serving as a scanning motor for rotating the polygon mirror 236 at a predetermined revolving speed to be described later, and an optical system 242 for deflecting a laser beam emitted from the polygon mirror 236 and guiding the beam to a photosensitive drum to be described later.

The laser aligner 240 having the above configuration is fixed to and supported by a support frame of the device body 200, to be described later.

The semiconductor laser 241 is turned on/off in accordance with the image information of the document D read by the scanner section 50.

A laser beam emitted from the semiconductor laser 241 is directed to photosensitive drums 244a to 244d by the polygon mirror 236 and optical system 242 to form an electrostatic latent image on each drum periphery by scanning the photosensitive-drum peripheries.

Moreover, the image-forming section 52 has rotatable photosensitive drums 244a to 244d serving as image-carrying bodies arranged at the approximate center of the device body 200.

A desired electrostatic latent image exposed by a laser beam emitted from the laser aligner 240 is formed on peripheries of the photosensitive drums 244a to 244d.

The following are arranged in order around the photosensitive drums 244a to 244d: an electrification charger 245 for electrifying drum peripheries to a predetermined electric charge, a development device 246 for supplying toner serving as a developer to an electrostatic latent image formed on peripheries of the photosensitive drums 244a to 244d and developing the image at a desired image density, a removal charger 247 for removing the material to be transferred supplied from sheet-feeding cassettes 252, 253, 254, 255, and 257, that is, for removing a copying sheet P from the photosensitive drums 244a to 244d, a transfer charger 248 for transferring a toner image formed on the photosensitive drums 244a to 244d to the paper P, a removal nail 249 for removing the copying sheet from the peripheries of the photosensitive drums 244a to 244d, a cleaner 250 for removing toner remaining on the peripheries of the photosensitive drums 244a to 244d, and a static eliminator (not illustrated) for eliminating static electricity from the peripheries of the photosensitive drums 244a to 244d.

The sheet-feeding cassettes 252, 253, and 254 which can be drawn from the device body 200 are arranged in a stacked state below the device body 200.

Copying sheets different from each other in size are set in the cassettes 252, 253, and 254.

A large-capacity sheet-feeding cassette 255 is set to sides of these cassettes 252, 253, and 254.

About 3,000 copying sheets to be frequently used such as A4-size copying sheets can be housed in the large-capacity sheet-feeding cassette 255.

Moreover, a sheet-feeding cassette 257 also serving as the manual tray 256 are removably set above the large-capacity sheet-feeding cassette 255.

A carrying route 258 extended from each cassette by passing through a transfer section located between the photosensitive drums 244a to 244d and the transfer charger 248 is formed in the device body 200.

A fixing device 260 is set to the dead end of the carrying route 258.

An ejection port 261 is formed on the sidewall of the device body 200 opposite to the fixing device 260.

A finisher 300 is set to the ejection port 261.

The finisher 300 will be described later in detail.

A pickup roller 263 for taking out sheets from a cassette one by one is set nearby the sheet-feeding cassettes 252, 253, 254, 255, and 257 respectively.

Moreover, many sheet-feed-roller pairs 264 for carrying the copying sheet P taken out by the pickup roller 263 through the carrying route 258 are set to the carrying route 258.

A resist-roller pair 265 is set to the upstream side of the photosensitive drums 244a to 244d in the carrying route 258.

The resist-roller pair 265 corrects any inclination in the taken-out copying sheet P, matches the front end of a toner image on the photosensitive drums 244a to 244d with the front end of the copying sheet P, and feeds the copying sheet P to the transfer section at the speed equal to the moving speed of peripheries of the photosensitive drums. Moreover, an aligning sensor 266 for detecting arrival of the copying sheet P is se to this side of the resist-roller pair 265, that is, the sheet-feed roller-264 side.

The copying sheet P taken out from each cassette by the pickup roller 263 one by one is sent to the resist roller pair 265 by the sheet-feed-roller pairs 264.

Then, the copying sheet P is sent to the transfer section after the front end of the sheet P is adjusted by the resist roller pair 265.

A developer image formed on the photosensitive drums 244a to 244d, that is, a toner image is transferred onto the sheet P by the transfer charger 248.

The copying sheet P to which the toner image is transferred is removed from peripheries of the photosensitive drums 244a to 244d by actions of the removal charger 247 and removal nail 249 and carried to the fixing device 260 through a carrying belt 267 constituting a part of a carrying route 252.

Then, the developer image is melted and fixed to the copying sheet P by the fixing device 260 and then, the copying sheet P is ejected to the sheet ejection tray 362 of the finisher 300 through the ejection port 261 by the sheet-feed-roller pair 268 and a sheet-ejection-roller pair 269.

An automatic double-side device (ADD) 270 for reversing the copying sheet P passing through the fixing device 260 and resending the sheet P to the resist roller pair 265 is set below the carrying route 258.

The automatic double-side device 270 is provided with a temporarily storing section 271 for temporarily storing the copying sheet P, a reversal route 272 branched from the carrying route 258 to reverse the copying sheet P passing through the fixing device 260 and guide it to the temporarily storing section 271, a pickup roller 273 for taking out the copying sheet P from the temporarily storing section one by one, and a sheet-feed roller 275 for feeding a taken-out sheet to a resist roller pair 2655 through a carrying route 274.

Moreover, a distribution gate 276 for selectively distributing the copying sheet P to the ejection port 261 or reversal route 272 is set to the branch portion between the carrying route 258 and the reversal route 272.

When performing double-side copying, the copying sheet P passing through the fixing device 260 is guided to the reversal route 272 by the distribution gate 276 and temporarily stored in the temporarily storing section 271 while reversed, then sent to the resist roller pair 265 through the carrying route 274 by the pickup roller 273 and sheet-feed roller pair 275.

Then, the copying sheet P is position-adjusted by the resist roller pair 265 and sent to the transfer section again, and a toner image is transferred to the back of the copying sheet P.

Thereafter, the copying sheet P is ejected to the sheet-ejection tray 362 of the finisher 300 through the fixing device 260 and sheet-ejection roller 269.

Moreover, by using the automatic double-side device 270, it is possible to eject a sheet by turning the printed face of a sheet downward.

That is, similarly to the procedure for performing double-side copying, a sheet on whose surface an image is transferred and fixed is temporarily stored in the temporary storing section 271.

Then, the sheet temporarily stored in the temporarily storing section 271 is passed through the carrying route 274 by the pickup roller 273 and sheet-feed roller pair 275 and position-adjusted by the resist roller 265 and then, ejected to the sheet-ejection tray 362 through the fixing device 260 and sheet-ejection roller 269.

Figure 3:
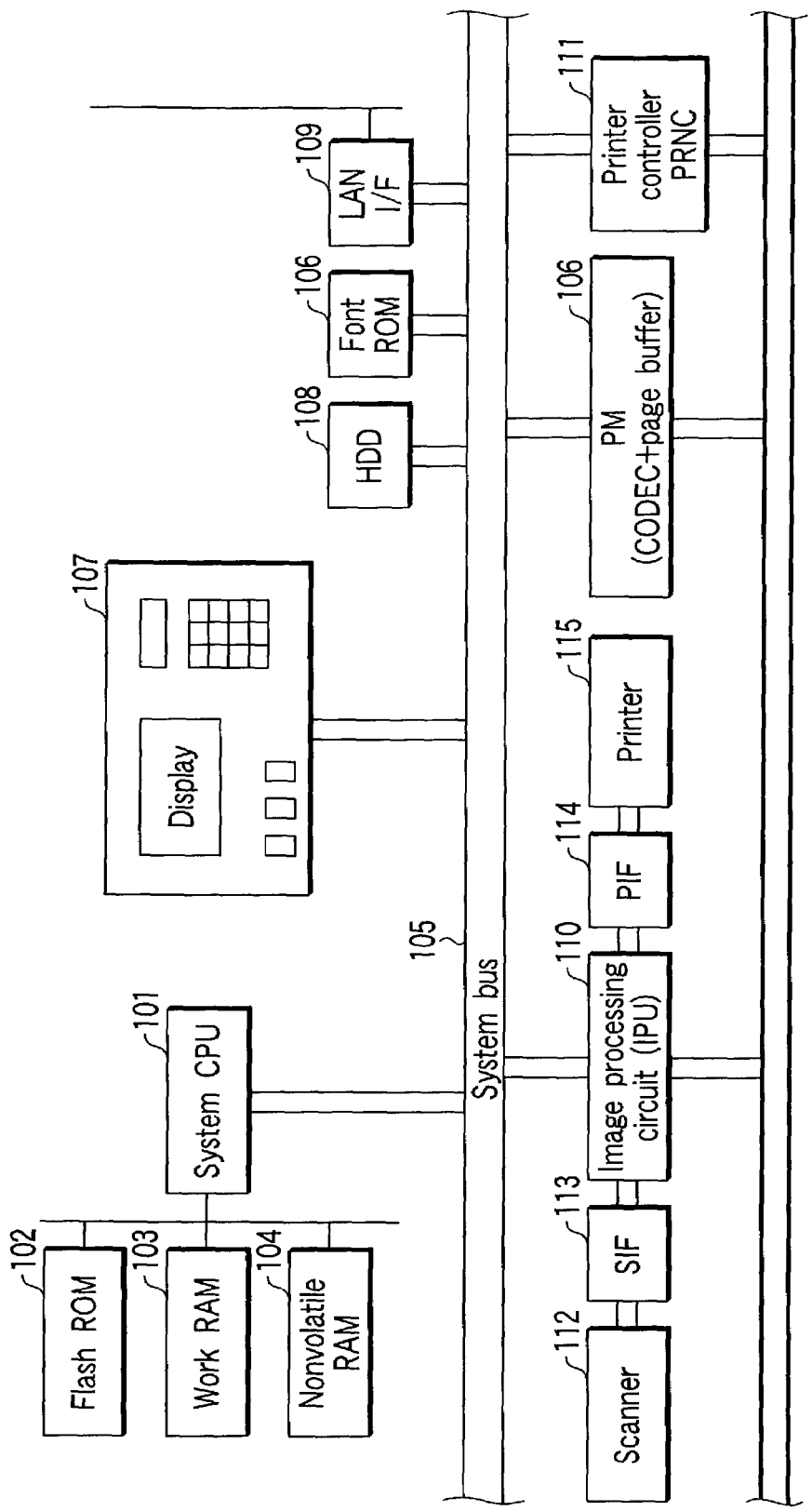
FIG. 3 is a block diagram showing a system configuration of a control system of a composite-type image-forming device of an embodiment of the present invention.

FIG. 3 is a block diagram showing a configuration of a control system of the composite-type image-processor in FIG. 1.

The control system has a system CPU 101, a flash ROM 102 connected to the system CPU 101 to store a program and data, a DRAM 103 for performing operations and storing data, and a nonvolatile RAM (NVRAM) 104.

Moreover, the control system has a font ROM 106 connected to the system CPU 101 through a system bus 105, an operation panel 107, a hard-disk drive (HDD) 108, and a LAN interface 109.

Furthermore, the control system has an image processing circuit (IPU) 110 to be described later connected to the system CPU 101 through the system bus 105, a printer controller (PRNC) 111, and an image memory (PM) 100.

Furthermore, a scanner 112 and a scanner interface (SIF) 113 to be described later are connected to the front stage of the image processing circuit (IPU) 110.

Furthermore, a printer interface (PIF) 114 and a printer 115 to be described later are connected to the rear stage of the image processing circuit (IPU) 110.

The system CPU 101 of the control system controls the whole of the present device. In this case, however, the system CPU 101 controls functions in accordance with designations from the operation panel 107, signals input from a communication line, or signals input from various external interfaces.

The SIF 113 serves as a scanner interface for receiving image data from the scanner 112.

The SIF 114 serves as a printer interface for transmitting image data.

The IPU (Image Processing Unit) 110 serving as an image processing circuit serves as an image-processing section for performing image edition such as image-quality improvement, expansion and contraction, pixel thinning, and whitening of a designated area by marker detection corresponding to the printer 115 serving as a recorder.

These devices 110 to 115 are connected to each other through an image bus.

Control signals are transferred between the system CPU 101 and the devices 110 to 115 through the system bus 105 at high speed.

Moreover, the image bus is a unique bus to be used for the composite-type image processor to operate as a copying machine.

That is, to assure real-time operations of the copying machine, operations of receiving the image data input from the scanner 112 by the SIF 113 through the image bus, applying image-quality improvement, expansion/contraction, and various editing of the image data, and outputting the data to the printer 115 through the PIF 114 in parallel are executed in parallel (these operations are referred to as basic copying).

Among the boards connected to the image bus, a processing board unnecessary for the then operation is brought into a passing state.

Moreover, the PRNC 111 has an interface with the printer section 115 for controlling the image-forming function under copying or printer operations and also serves as a printer controller connected to a LAN through a device such as an NIC (Network Interface Card) to perform the protocol control and data transfer/compression/expansion control for receiving print data from an external device such as PC through the LAN, buffering the data, and transferring the data to the printer section 115.

Furthermore, the image memory (PM) 100 is a memory having a CODEC and a page buffer, described later, to temporarily store image data.

Figure 4:
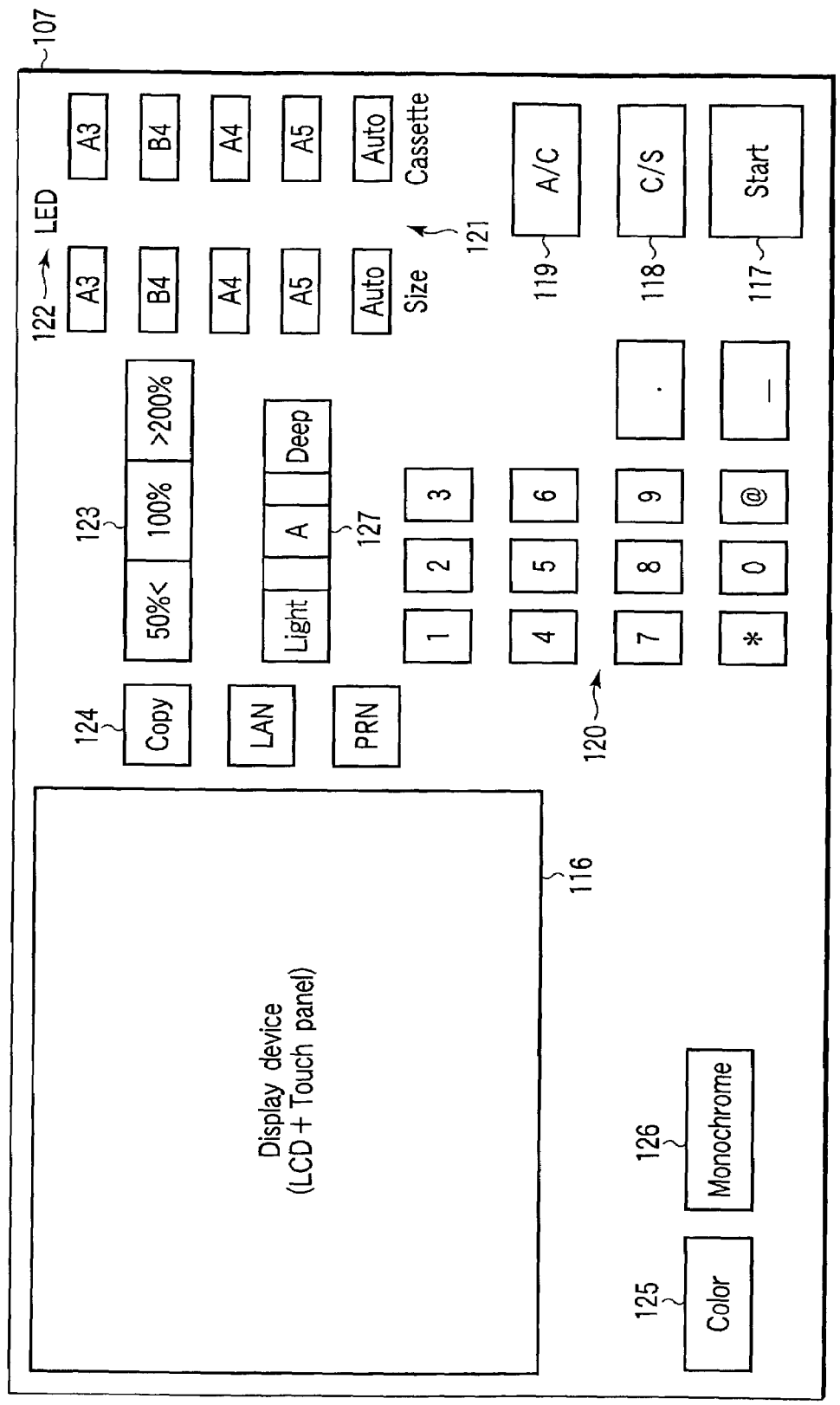
FIG. 4 is an illustration showing a configuration of a an operation panel of the composite-type image-forming device in FIG. 1.

FIG. 4 is an illustration showing a configuration of the operation panel 107.

As shown in FIG. 4, the operation panel 107 is provided with a touch-panel display 116 using an LCD serving as a display device, a start key 117, a stop key 118, a clear key 119, a ten-key pad 120 for setting numerals, a key 121 for selecting a document size or a cassette, an LED 122 for displaying a selected document size or cassette, a copying-magnification-setting key 123, a processing-mode-selection key 124, and various selection keys 125 and 126 and a density-setting key 127 so that a color or monochrome mode can be designated.

Moreover, not only ten keys from "0" to "9" but also keys such as "*", ",", "@", and "_" are provided for the key pad 120 so that they can be used for copying control as well as inputting mail addresses.

For example, five copies are obtained by selecting "COPY" with the processing-mode-selection key 124 to change the menu on the display 116 to copying, selecting a desired processing (such as image copying), and pressing the key "5" on the ten-key pad 120.

Then, the numeral "5" is displayed in a specific area on the touch-panel display 116.

When a user confirms the numeral and sets a document, and presses the start key 117, copying is started.

FIG. 5 is a block diagram showing how the various sections of the above touch-panel display 116 are connected.

The touch-panel display 116 is constituted by setting the touch-panel 128 on a liquid-crystal display 129.

A touch panel 128 is constituted by uniformly applying transparent resistors on a transparent substrate and arranging transparent electrode groups in parallel at predetermined intervals in X and Y directions.

Moreover, voltages are successively applied to the X- and Y-directional transparent electrodes of the touch panel 128 in certain directions under the control of a touch-panel control section 130.

A position is designated to the touch panel 128 by using an exclusive conductive pen or a finger.

The touch-panel control section 130 monitors the resistance value between electrodes in X and Y directions and detects a position at which a resistance value is locally reduced in accordance with a designation by a conductive pen or finger through an operation in accordance with the resistance value between electrodes.

Moreover, the liquid-crystal display 129 is connected to a display control section 131 for display-driving the display 129, and a video RAM (VRAM) 132 for storing display data in display pixels as a device-information-holding module for holding inherent device information including the control information to be possessed by an image-forming device.

In the case of the touch panel display 116 serving as a user interface, described later, constituted as described above, the position data obtained by the touch-panel control section 130 is read by the system CPU 101 in a main control section and the processing corresponding to the position data is executed by the system CPU 101.

For example, to perform handwriting input, the data on the VRAM 132 corresponding to a position designated on the touch panel 128 is inverted from a non-display state to a display state and a keyboard display and various setting buttons are displayed on the liquid-crystal display 129.

Then, it is possible to use the touch panel display 116 for various purposes such as inputting of an operation parameter selected by a user from the various setting buttons displayed on the liquid-crystal display 129.

Figure 6:
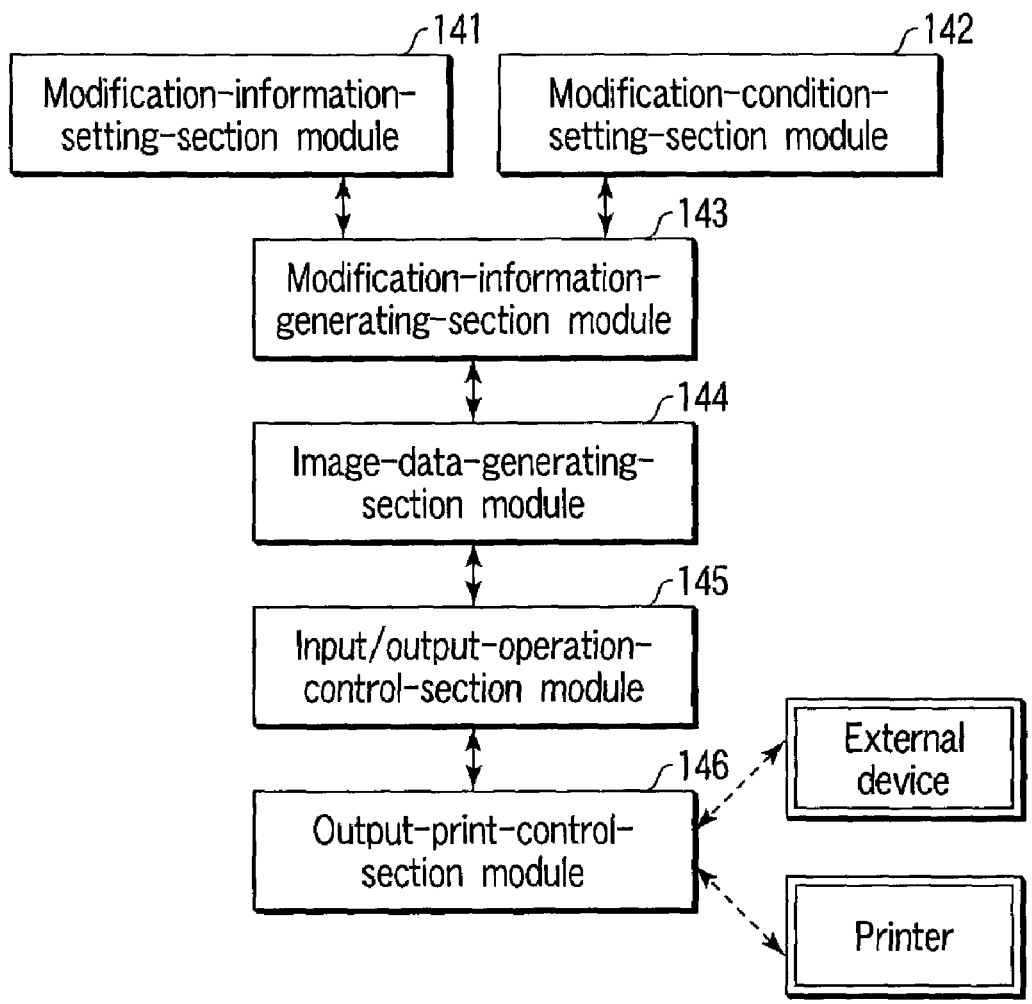
FIG. 6 is a functional-module diagram showing a conceptual configuration of control software blocks constituting an image-forming device of the present invention.

FIG. 6 is a module diagram showing a conceptual configuration of hardware elements and control software blocks constituting the image-forming device of the present invention.

In FIG. 6, a modification-information-setting-section module 141 and a modification-condition-setting-section module 142 are constituted by the operation panel 107 of the present device described for FIGS. 4 and 5 and display control software for controlling the modules 141 and 142.

Figure 10A:
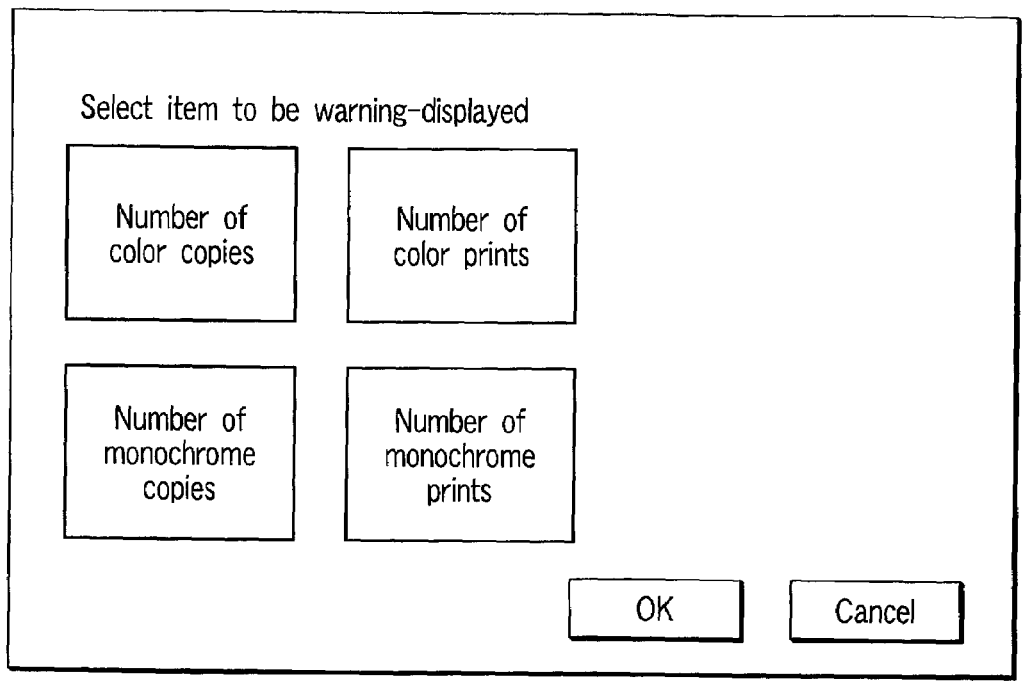
FIGS. 10A and 10B are illustrations showing color-information-setting screens of an image-forming device of the present invention.
Figure 10B:
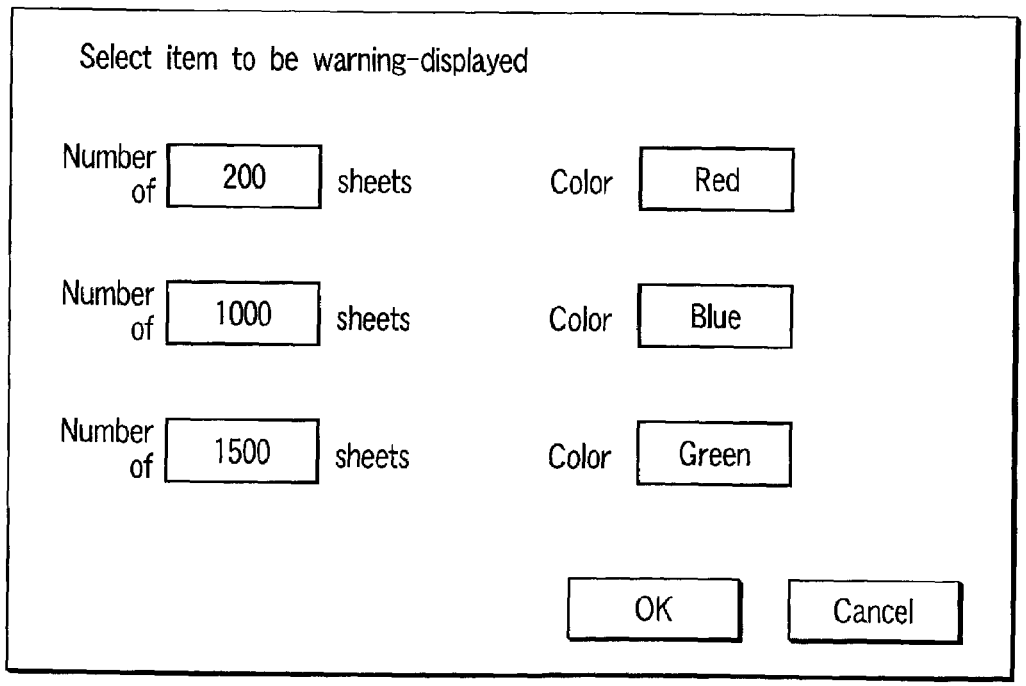

In this case, as shown in FIGS. 10A and 10B, the modification-information-setting-section module 141 and modification-condition-setting-section module 142 serve as user interfaces and display a modification-condition-setting screen and a modification-content-setting screen on the operation panel 107, set the color, type of character modification, and modification content of the image data to be output, and store their setting contents in the NVRAM 104 in FIG. 3.

These modules function as condition-setting modules for setting a reference value of specific device information in the above device information as a condition.

Moreover, in FIG. 6, a modification-information-generating-section module 143 determines whether device control information meets conditions for performing various preset character modifications in accordance with the contents set by a coloring-information setting section and a coloring-condition setting section, decides the character information to be generated and the type of color in an area about the type of character modification, and generates formatted list data including modification codes as shown in FIG. 15 to be described later.

Furthermore, an image-data-generating-section module 144 develops actual image data on a page buffer in accordance with the formatted list data (refer to FIG. 15) generated by the modification-information-generating-section module 143 and the font data stored in the font ROM 106 in FIG. 3 and adds a modification code to the image data as described later.

Then, the image-data-generating-section module 144 repeats generation of these processings about the whole data every line and when generation of image data for one page is completed, compresses the data and stores the data in the HDD 108 in FIG. 3.

Moreover, after the image-data-generating-section module 144 executes the above operations for all pages, it directs an input/output-operation-control-section module 145 to start printing.

In FIG. 6, the input/output-operation-control-section module 145 includes the image-processing unit (IPU) 110 in FIG. 3 and has an interface with an output (printer)-control-section module 146 to be described later and is constituted by the so-called control software for executing a job control function to properly direct the output (printer)-control-section module 146 to start or interrupt an operation for the image data stored in the HDD 108 while checking the operating state of the whole device.

Moreover, the input/output-operation-control-section module 145 not only controls its jobs but also computes image-processing parameters and sets the parameters to the image-processing unit.

In FIG. 6, the output(printer)-control-section module 146 is constituted by printer-operation-control firmware for a printer device, a printer-control ASIC, an output-side image processing ASIC, and printer-operation-control firmware for performing printer control and sheet-carrying control under printing, and printer-side image-processing firmware.

The output(printer)-control-section module 146 has an interface with the printer controller 111 in FIG. 3 to perform communication of commands such as a control command and a status and print-data communication control.

Moreover, the output(printer)-control-section module 146 has an individual control CPU to realize high-speed controls.

These controls perform command-status communication between the output (printer)-control-section module 146 and the system CPU 10 in FIG. 3 and control synchronous operations between a display, a scanner, and a printer to realize copying and printing-out operations of the whole device.

Figure 7:
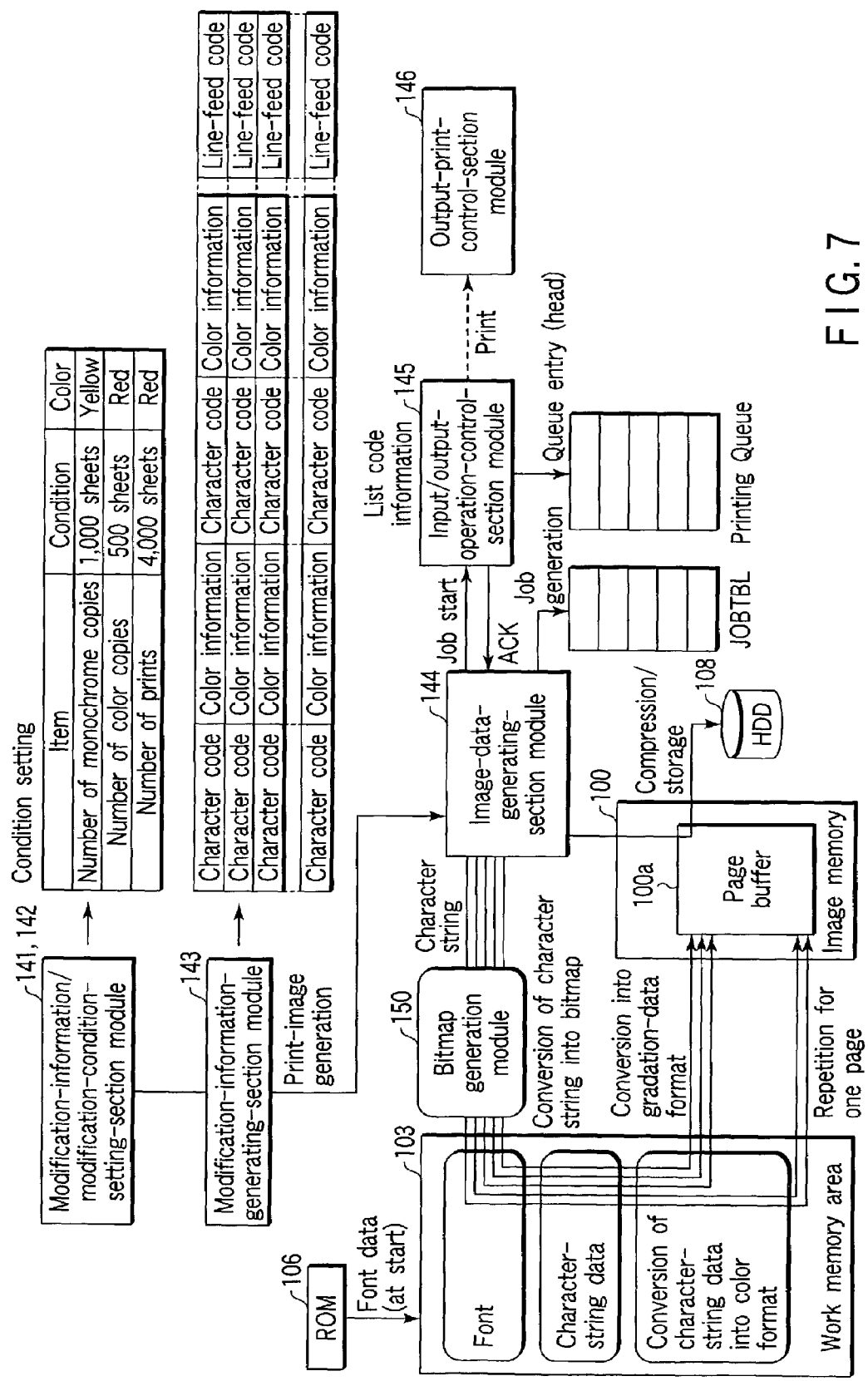
FIG. 7 is an illustration showing a flow of control by an image-forming device of the present invention.

FIG. 7 is an illustration showing the flow of control of the present system.

As shown in FIG. 7, an item in which character modification may occur and the type of modification in the above case, and a threshold value generated by the type of modification are set in modification-information/modification-condition-setting-section modules 141 and 142.

Then, the above conditions are collated with machine information in the modification-information-generating-section module 143 to generate character-string information to be supplied to the image-data-generating-section module 144.

Specifically, the modification-information-generating-section module 143 adds a modification code to each character string and moreover adds a line-feed code and a page-feed code to each character string.

After the modification-information-generating-section module 143 generates these pieces of information, it supplies character-string information to the image-data-generating-section module 144.

Thereby, the image-data-generating-section module 144 starts generation of image data.

Specifically, the image-data-generating-section module 144 reads font data from the character-string information through a bit-map-generating module 150 and generates bit-map data on the DRAM 103 serving as a main memory every line.

The bit-map data is converted into a color format comprising brightness information and color-difference information and then, developed on a page buffer 100a in the image memory (PM) 100 in FIG. 3.

Figures 8, 9A:
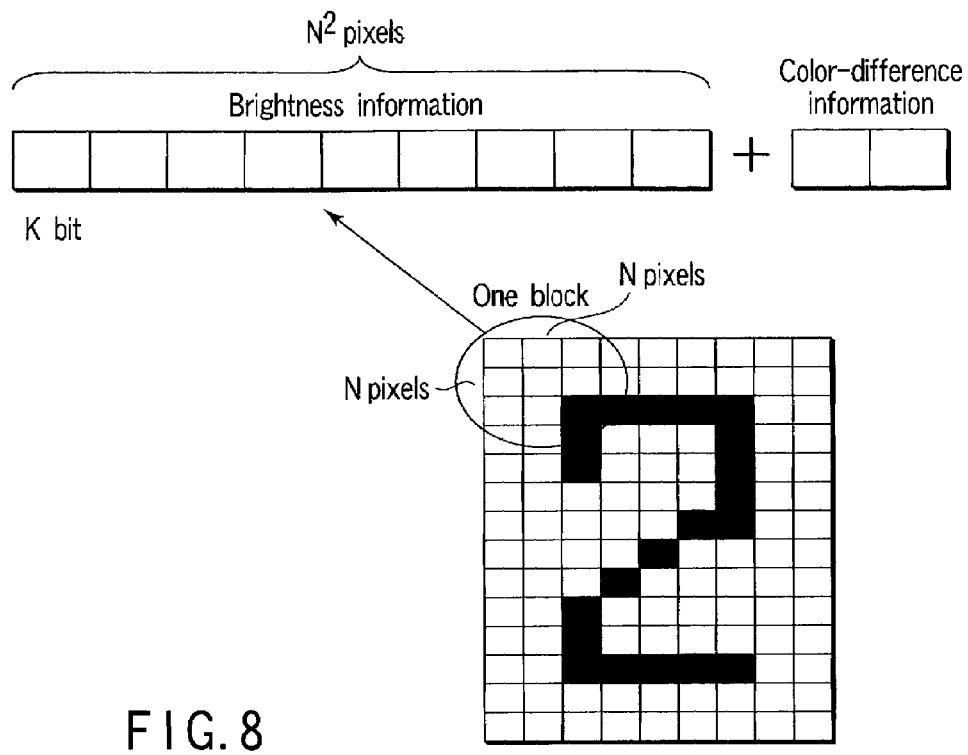
FIG. 8 is an illustration showing conversion contents when developing character data developed on a main memory of an image-forming device of the present invention on a page buffer of the device.
FIGS. 9A and 9B are illustrations showing information control tables of an image-forming device of the present invention.

The color format is gradation data in which one block is constituted by N*N pixels as shown in FIG. 8.

FIG. 8 shows a state in which the brightness component of each pixel of the color format is expressed by k bits, color-component information is added to the bits every block to develop the bits on the page buffer 100a.

Moreover, for the color-difference information, it is possible to optionally operate color information by setting a proper value as shown in FIG. 8.

Image data is compressed when the data for one page is developed and then, stored in a storage medium such as the HDD 108.

When the same processing is completed for the data of all pages, the image-data-generating-section module 144 enters the data in JOBTBL as a print job and directs the input/output-operation-control-section module 145 to start printing.

The input/output-operation-control-section module 145 monitors the state of the device and when it is allowed to print out print data, directs the printing-control-section module 146 to start printing out the print data.

However, while copying is executed, sheets are exhausted, or an error occurs, start of printing is suspended.

Then, the printing-control-section module 146 executes printing when start of a job is designated by the input/output-operation-control-section module 145 and communicates end of printing to the input/output-operation-control-section module 145 when printing is completed.

The end notice is communicated to the modification-information/modification-condition-setting-section modules 141 and 142 through the image-data-generating-section module 144.

Figure 9B:
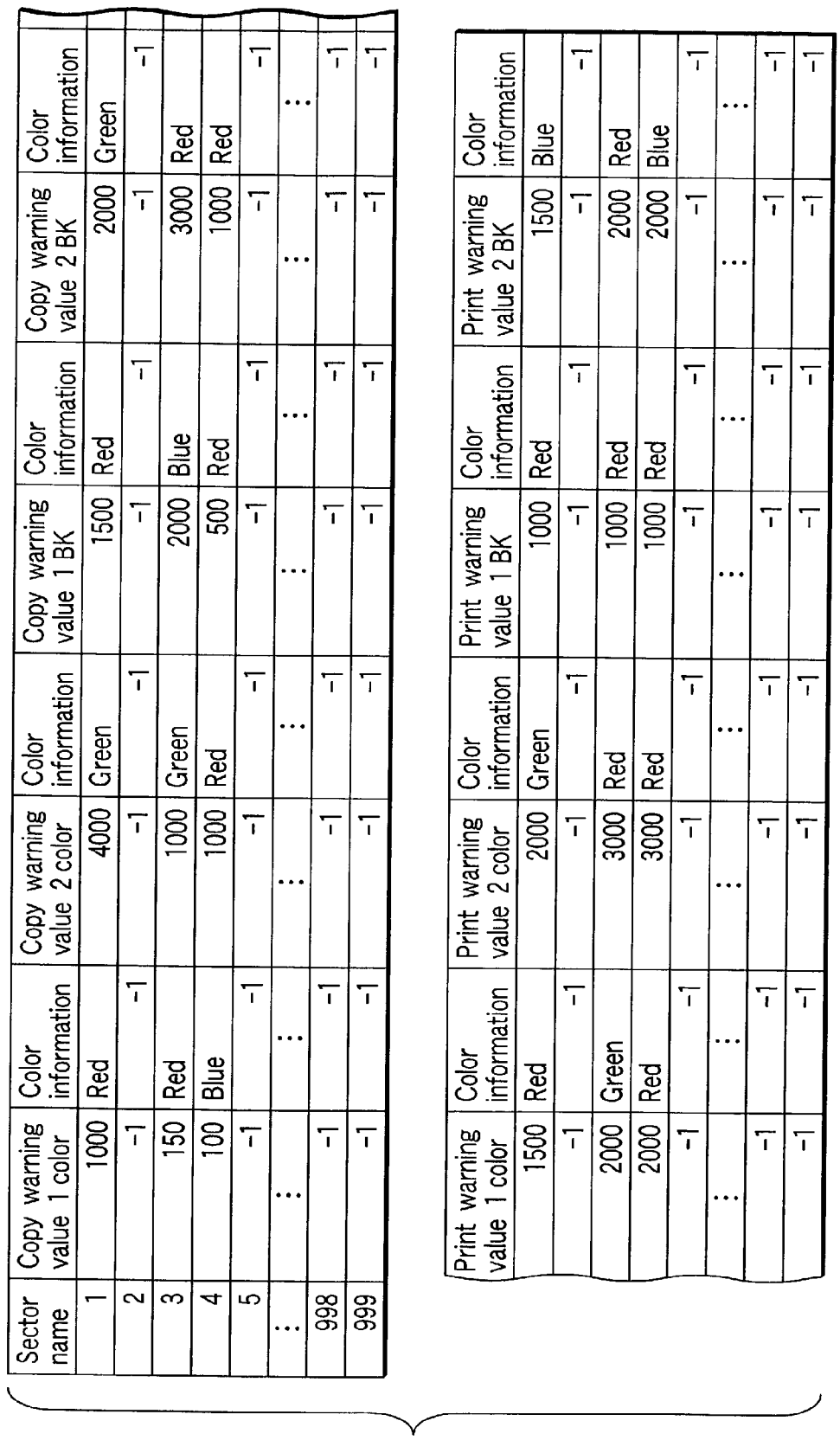

FIGS. 9A and 9B are illustrations showing machine control information.

FIGS. 9A and 9B show configurations in which the information for the numbers of color copies, monochrome copies, color prints, and monochrome prints every sector are stored in the NVRAM 104 in the form of a table.

In this case, the actual numbers of copies and prints every sector are stored or −1 is stored for a warning value and color information.

FIG. 9B shows that a warning value or color information is not entered in the second sector.

Moreover, pieces of warning-value information entered through user interfaces shown in FIGS. 10A and 10B are entered every sector.

These pieces of the information are stored in the non-volatile memory (NVRAM) 104 and read and updated according to necessity.

FIGS. 10A and 10B are illustrations showing images of operation screens serving as user interfaces for setting conditions in the modification-information/modification-condition-setting-section modules 141 and 142 when adding the above color information.

For example, to set conditions for the number of copies or the number of prints out of the data showing the working state of a device when outputting a control-information list, a user selects a corresponding icon in FIG. 10A.

Then, as shown in FIG. 10B, a threshold value for the number of copies or the number of prints and a character-color setting screen are displayed.

This example shows that it is possible to set three levels of threshold values for the number of copies or the number of prints. For example, it is possible to set the number of copies or the number of prints so as to change colors in accordance with a condition such as "red" between 200 and 1,000, "blue" between 1,000 and 1,500, or "green" for 1,500 or more.

Figure 11:
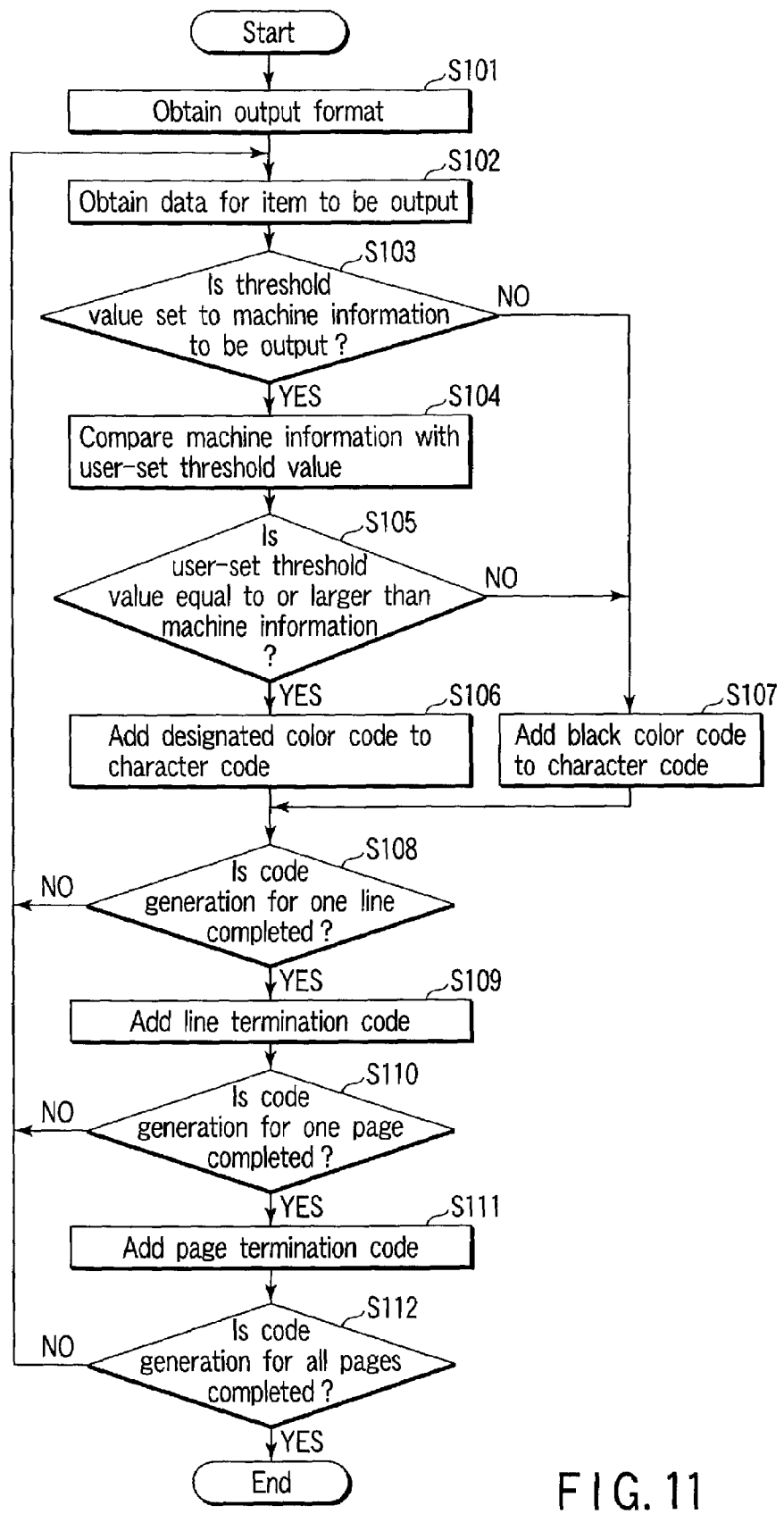
FIG. 11 is a flowchart showing a control sequence by the modification-information-generating section of an image-forming device of the present invention.

FIG. 11 is a flowchart showing a control sequence by the modification-information-generating-section module 143.

First, the modification-information-generating-section module 143 obtains an output format in step S101 and the data for an item to be output in step S102 and then determines in step S103 whether a threshold value is set to machine control information to be output.

In this case, when any threshold value is set in step S103, the modification-information-generating-section module 143 compares the machine control information set in accordance with the mode shown in FIGS. 9A and 9B with a user-set threshold value.

The control information in the above case shows the data inherent in a machine such as the number of copies to be used every sector.

Then, the modification-information-generating-section module 143 determines which is larger, the machine control information or the user-set threshold value in step S105. When a larger value exceeds the first threshold value set by the user, the module 143 fetches a color code serving as warning information designated by the user in FIG. 10B in step S106 and adds the color code to the machine control information.

However, when the value does not exceed the first threshold value, the modification-information-generating-section module 143 adds a color code of black to a character code in step S107.

Then, the modification-information-generating-section module 143 determines in step S108 whether the above comparison is completed for all threshold values designated by the user. When the comparison is not completed, the modification-information-generating-section module 143 the modification-information-generating-section module 143 repeats processings in and after step S102.

In this case, when the above comparison is completed for all threshold values designated by the user, the modification-information-generating-section module 143 adds a line-feed (line termination) code in step S109 when the line-feed code is necessary.

Determination on the necessity for addition of the line-feed (line termination) code is performed in accordance with the format information when preset control information is output.

Then, the modification-information-generating-section module 143 executes the same modification-information generation also for other machine control information in step S110.

Then, when information generation is completed for the whole machine control information, the modification-information-generating-section module 143 adds a page-feed code in step S111 and then, executes the code generation for all pages.

Then, when the code generation for all pages is completed, the modification-information-generating-section module 143 directs the image-data-generating-section module 144 to generate image data and then, completes processing.

Figure 12:
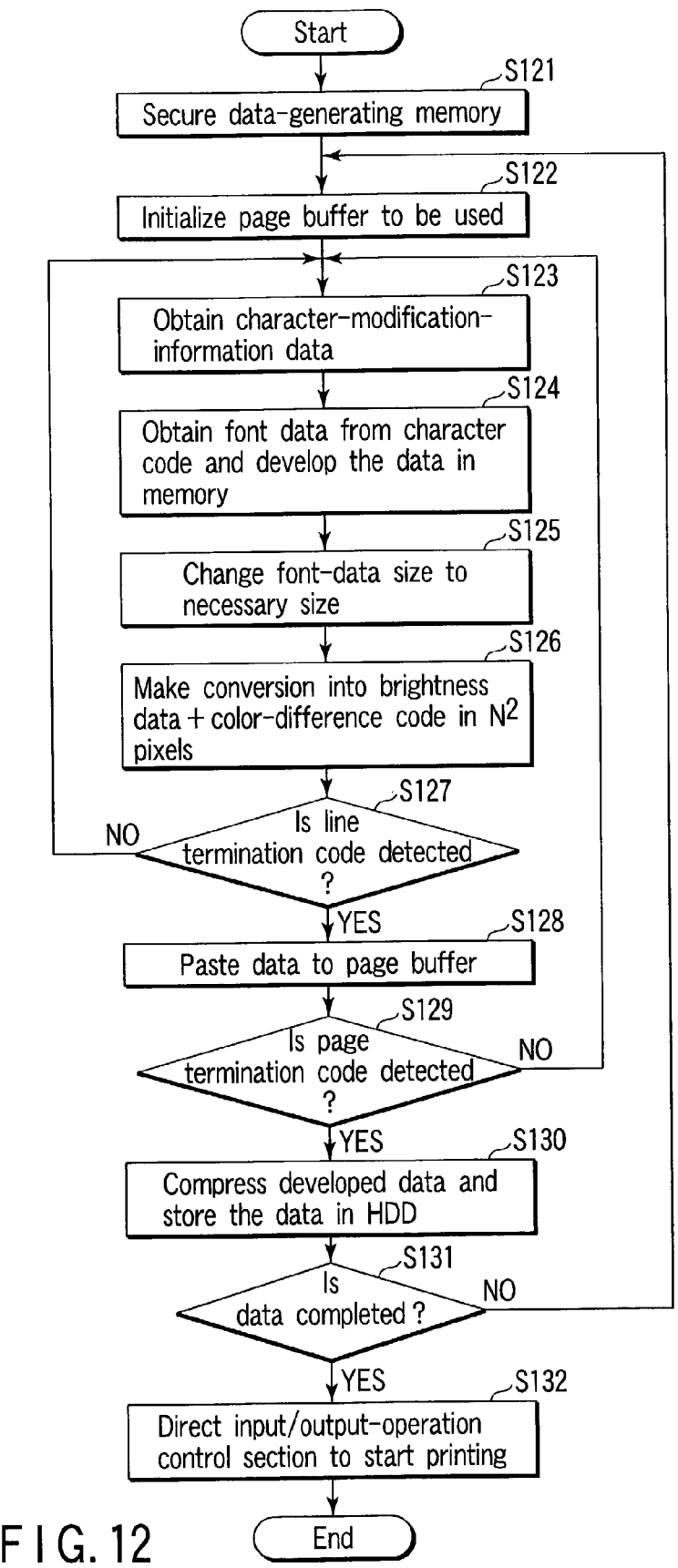
FIG. 12 is a flowchart showing a control procedure when generating image data in an image-forming device of the present invention.

FIG. 12 is a flowchart showing a control sequence by the image-data-generating-section module 144.

First, the image-data-generating-section module 144 secures the DRAM 103 serving as a work memory for developing font data and a work memory for developing the conversion data to be pasted to the page buffer 100a in step S121.

Then, the image-data-generating-section module 144 initializes a memory to be used in the page buffer 100a in step S122.

Then, the image-data-generating-section module 144 obtains the character modification data generated through the processing shown in FIG. 11 in step S123, and obtains font data from a character code and develops the data on the memory in step S124.

Then, the image-data-generating-section module 144 converts the data into an actual character size in step S125 and moreover, converts the data into the format of brightness data+color-difference data every N*N pixels in step S126 as shown in FIG. 8.

Then, the image-data-generating-section module 144 continues the above processings until a line termination code is detected in step S127. When generating the data for one line, the image-data-generating-section module 144 pastes the data in the page buffer 100a sown in FIG. 7 instep S128.

Moreover, the image-data-generating-section module 144 repeats these processings every one line until a page termination code is detected in step S129. When the processings for one page are completed, the image-data-generating-section module 144 compresses the developed data and stores the compressed data in the HDD 108 in step S130.

Then, the image-data-generating-section module 144 repeats the above processings for the whole data generated through the processings in FIG. 11 every page in step S131. When all processings are completed, the image-data-generating-section module 144 directs the input/output-operation-control-section module 145 to start printing in step S132 and then the flow ends.

Figure 13:
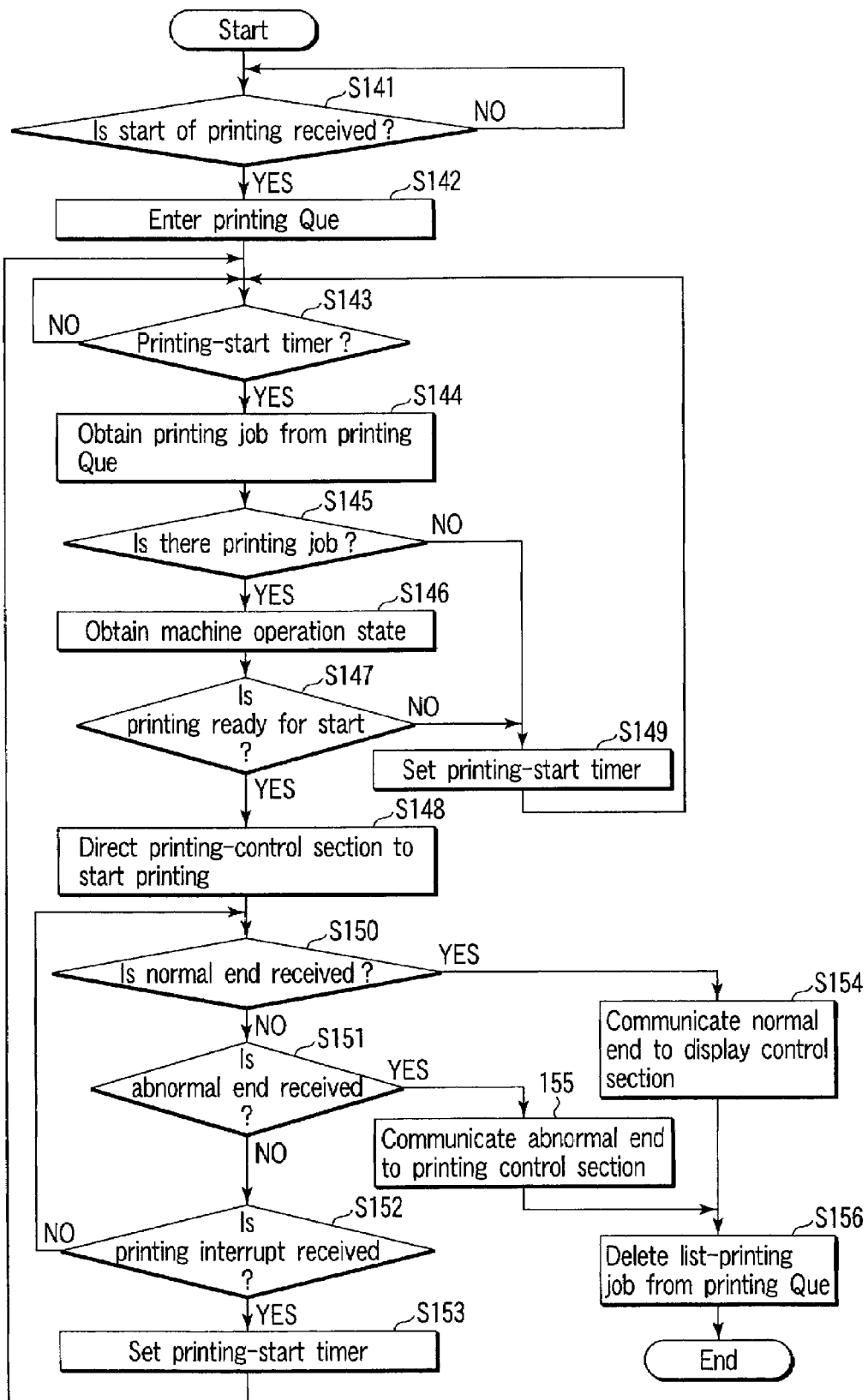
FIG. 13 is a flowchart showing a control procedure of the input/output-operation control section of an image-forming device of the present invention.

FIG. 13 is a flowchart showing a control sequence by the input/output-operation-control-section module 145.

First, when start of printing is designated, the input/output-operation-control-section module 145 enters designated printing JOB in a printing queue.

The printing queue successively accepts various printing jobs such as copying and print data and stores the priority every job, entry time, file name, and file-attribute information (such as page size and number of sheets).

Then, the input/output-operation-control-section module 145 determines in step S143 whether a printing-start timer interrupt is present. When detecting the printing-start timer interrupt, the input/output-operation-control-section module 145 fetches the head printing job from the printing queue.

Then, the input/output-operation-control-section module 145 determines in step S145 whether a printing job is present in the queue. When a printing job is present, the input/output-operation-control-section module 145 further obtains a machine operating state in step S146.

When no printing job is present in the printing queue, the input/output-operation-control-section module 145 skips to step S149 to set a printing-start timer and is brought into a waiting state.

Then, the input/output-operation-control-section module 145 repeats processings in and after step S143, fetches a job from the printing queue similarly to the above described, obtains a machine state, and starts printing.

In this case, though not illustrated, the machine operating state denotes the data showing factors for controlling whether to execute a printing job such as an error occurrence state, other job execution state, low-power-consumption mode state, remaining-number-of-sheets information, and holding-size information or denotes normally-controlled states in the machine-information-control TBL shown in FIG. 7.

Then, the input/output-operation-control-section module 145 determines in step S147 whether the present state is a printing-possible state by comparing the above data values with the attribute information of a printing job. When the present state is the printing-possible state, the input/output-operation-control-section module 145 communicates start of printing to the output(printing)-control-section module 146 in step S148.

In this case, when the present state is a printing-impossible state, the input/output-operation-control-section module 145 skips to step S149 to set the next printing-start timer and waits.

Then, the input/output-operation-control-section module 145 determines whether the normal end of printing is received from the output (printing)-control-section module 146. When the normal end is received, the input/output-operation-control-section module 145 skips to step S154 to communicate the normal end to the display control section in the system CPU 101 and then skips to step S156 to delete a corresponding list-printing job from the printing queue shown in FIG. 7 and the flow ends.

Moreover, when the normal end is not received, the input/output-operation-control-section module 145 determines in step S151 whether interrupt of printing is received from the output(printing)-control-section module 146. When the interrupt of printing is received, the input/output-operation-control-section module 145 sets a printing-start timer in step S153 and is brought into a waiting state.

When the interrupt of printing is not received, the input/output-operation-control-section module 145 repeats processings in and after step S150.

When the interrupt factor is canceled and the present state shifts to a printing-possible state, the input/output-operation-control-section module 145 repeats processings in and after step S143, fetches a job from the printing queue as described above at the timing of a printing-start-timer interrupt, obtains a machine state, and restarts printing.

Figure 14:
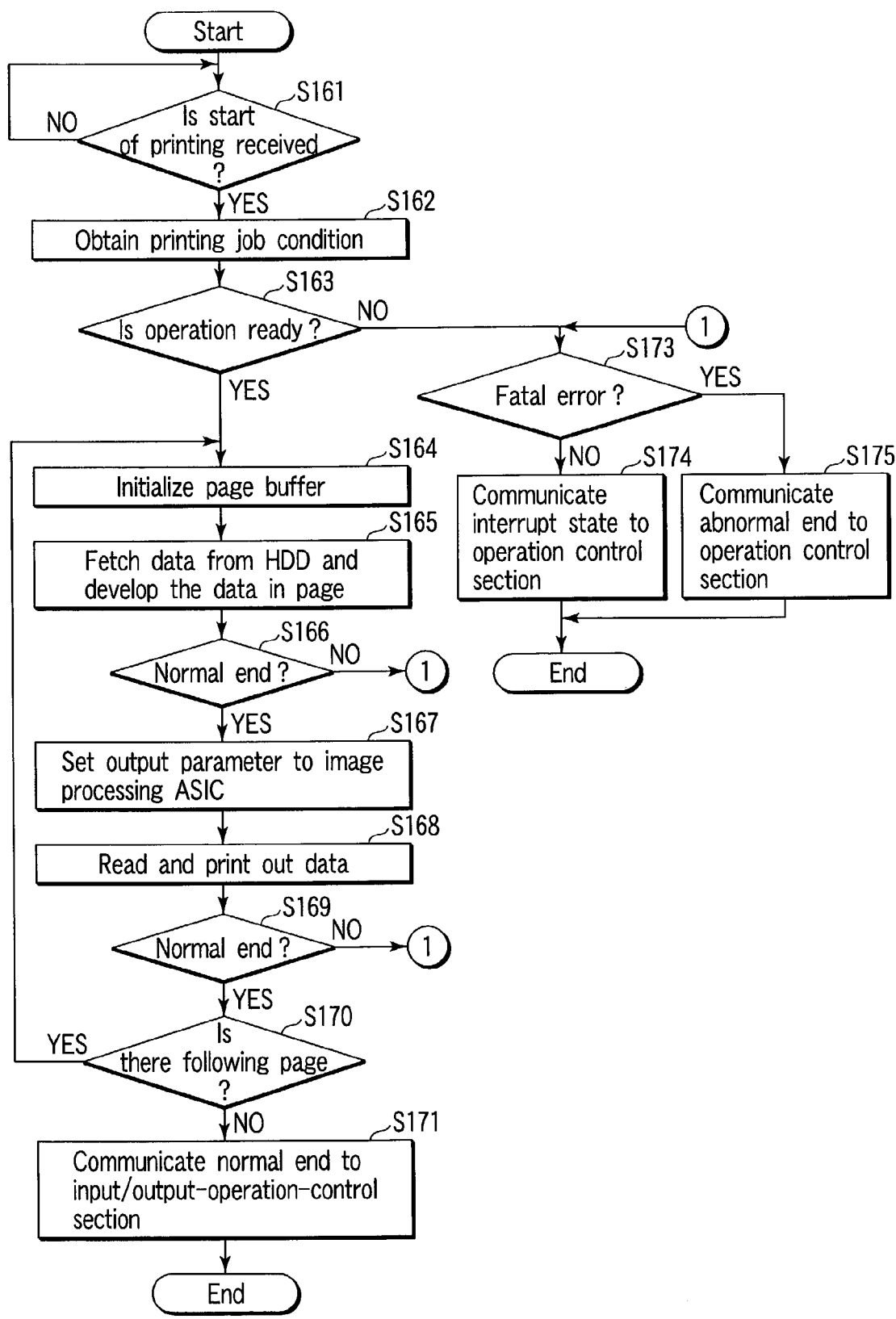
FIG. 14 is a flowchart showing a control procedure of the printing control section of an image-forming device of the present invention.

FIG. 14 is a flowchart showing a control sequence by the output(printing)-control-section module 146.

First, when start of printing is designated by the input/output-operation-control-section module 145 in step S161, the output(printing)-control-section module 146 obtains a printing job in step S162 and then, determines in step S163 whether the present state is an operation-possible state.

In this case, printing-job conditions denote a print file name, sheet-feed source, data size, sheet size, number of pages, and double-side/single-side printing information.

Moreover, when the present state is not the operation-possible state, the output(printing)-control-section module 146 skips to step S173 to determine whether the cause of the operation-impossible state is a fatal error state.

In this case, even if the present state is not the fatal error state, it is impossible to execute printing when a designated sheet size or a sheet-feed source is improper. Therefore, the output(printing)-control-section module 146 communicates occurrence of an interrupt state to the input/output-operation-control-section module 145 in step S174 and the flow ends.

Moreover, when the present state is a fatal error state such as a state in which a designated file name is not present, the output(printing)-control-section module 146 communicates abnormal end to the input/output-operation-control-section module 145 in step S175.

Then, when the output(printing)-control-section module 146 is in an operation-possible state, it initializes an area of the page buffer 100*a* to be used in step S164 and then, opens a corresponding file from the HDD 108 to fetch data and develops the data in the page buffer 100*a*.

Then, the output(printing)-control-section module 146 determines in step S166 whether development normally ends. When the data development normally ends, the module 146 sets a parameter for output to an image processing ASIC in step S167 and then, reads data from the page buffer 100*a* to print out the data in step S168.

However, when the data development does not normally end, the module 146 starts processings in and after step S173 to determine whether the present state is a fatal error state and performs processings.

When the printing-out normally ends, the output (printing)-control-section module 146 repeats these processings by the number of pages in step S170.

Then, when processings are executed up to the final page, the output (printing)-control-section module 146 communicates that the data development normally ends to the input/output-operation-control-section module 145 and completes processings in step S170.

FIG. 15 is an illustration showing formatted list data including the above format information.

In this case, the formatted list data is shown by a range in which one-line character code is enclosed by " " in aBuf shown in FIG. 15.

Moreover, an empty line is shown by " " and the final line is expressed by "LFLFLF".

Furthermore, color information can be expressed by eight colors such as C0, C1, . . . , and C7 to be described later every area enclosed by, ,.

Furthermore, for the color information, the data of a corresponding part of aData[8][2] shown in FIG. 15 is retrieved to obtain its header data.

In this case, C0 is expressed by black, C1 by red, C2 by blue, C3 by yellow, C4 by green, C5 by purple, C6 by yellowish green, and C7 by pink.

Then, the header data of C0 corresponds to 0x00110101.

Moreover, the header data of C2 corresponds to 0x01010011.

Furthermore, the header data of C3 corresponds to 0x01000001.

Furthermore, the header data of C4 corresponds to 0x01110100.

Furthermore, the header data of C5 corresponds to 0x11000010.

Furthermore, the header data of C6 corresponds to 0x11100100.

Furthermore, the header data of C7 corresponds to 0x11111000.

These header data are added as the data showing the color-difference information of the color format shown in FIG. 8.

FIG. 16 illustrates results of developing the formatted list data shown in FIG. 15 and printing out the data in accordance with the control flows shown in FIGS. 11 to 14.

In FIG. 16, underlines and characters "RED" and "BLUE" in character strings are added for convenience' sake so that processing results are easily understood and show colors by which these character strings are expressed.

Moreover, it is shown that portions to which these underlines or characters "RED" and "BLUE" are printed out in black.

In the case of actual output results, these underlines or characters "RED" and "BLUE" added for convenience' sake are not printed out.

Therefore, according to the present invention, it is possible to provide an image-forming device and a method for controlling the device making it possible for a user to designate a modification method for the information noted by the user in accordance with a condition desired by the user when printing out machine control information or operator information in the form of a list or report and print out the information noted by the user.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image-forming device comprising:
   a machine-control-information-holding module which holds at least specific machine-control information containing a control information list including a number-of-sheets-used-information on an image-recording medium to be held by the image-forming device;
   a condition-setting module which sets a reference value to the specific machine control information in the machine-control information as a condition;
   a character-data-generating module which fetches the specific machine control information from the machine-control-information-holding module when producing the control information list including the number-of-sheets-used-information on the image-recording medium, determining whether the specific machine-control information meets the condition set by the condition-setting module, adding predetermined color information to the specific machine-control information in accordance with the determination result, and converting the specific machine-control information added with the predetermined color information into character-string data;
   an image-data-generating module which converts the character-string data converted by the character-data-generating module into character-image data;
   an image-data-storing module which stores the character-image data converted by the image-data-generating module; and
   an image-forming module which reads the character-image data from the image-data-storing module and forms the control information list including the number-of-sheets-used-information on the image-recording medium as an image based on the character-image data on the image-recording medium,
   wherein the image-forming module has a function for at least one of coloring and character-modifying the specific machine-control information under a specific condition and for printing out the specific machine-control information.

2. An image-forming device according to claim 1, further comprising a user interface which displays a condition to be set by the condition-setting module when printing out the control information list including the number-of-sheets-used-information on the image-recording medium.

3. An image-forming device according to claim 1, wherein the image-forming module performs at least one of coloring and character modifying the character-image data to print out the data in accordance with a preset condition when printing out the control information list including the number-of-sheets-used-information on the image-recording medium.

4. An image-forming device according to claim 1, wherein the image-data-generating module has a function for generating character-image data by determining whether an item designated by a user meets a condition designated by the user when generating the control information list including the number-of-sheets-used-information and at least one of coloring the character-image data with a color designated by the user and character-modifying the character-image data by a modification method designated by the user when the item meets the condition, and
   the image-forming module has a function for printing out character-image data by at least one of coloring the character-image data with the color generated by the image-data-generating module and designated by the user and character-modifying the character-image data by a modification method designated by the user.

5. An image-forming device according to claim 1, wherein the image-data-generating module has a function for generating character-image data by applying respectively-inherent character modification to the specific machine-control information under a plurality of conditions and printing out the control information list including the number-of-sheets-used-information on the image-recording medium by applying respectively-inherent character modification to the specific machine-control information generated by the image-data-generating module under a plurality of conditions.

6. An image-forming device according to claim 1, wherein the image-forming module has a function for stepwise coloring each of the character-image data values with an inherent color about one item and printing out the control information list including the number-of-sheets-used-information on the image-recording medium correspondingly to a preset number of conditions when printing out the control information list including the number-of-sheets-used-information on the image-recording medium.

7. An image-forming device according to claim 1, wherein the image-data-generating module has a function for determining whether at least a threshold level is met for each of a plurality of conditions designated by a user about one item designated by the user when generating the control information list including the number-of-sheet-used-information and generating character-image data by coloring the character-image data with a color designated by the user in accordance with the threshold level meeting each of the plurality of the conditions, and the image-forming module has a function for printing out the control information list including the number-of-sheets-used-information on the image-recording medium by coloring the character-image data with a color designated by the user in accordance with the threshold level meeting each of the plurality of conditions.

8. An image-forming device comprising:

machine-control-information-holding means for holding a control information list including number-of-sheets-used-information on an image-recording medium as specific machine-control information to be held by the image-forming device;

condition-setting means for setting the reference value of the specific machine-control information as a condition;

character-data-generation means for fetching the machine-control information from the machine-control-information-holding means, determining whether the machine-control information meets the condition set by the condition-setting means, adding predetermined color information to the machine-control information in accordance with the determination result, and converting the machine-control information including the predetermined color information into character-string data when printing out the control information list including the number-of-sheets-used-information on the image-recording medium;

image-data-generating means for converting the character-string data converted by the character-data-generating means into character-image data;

image-data-storing means for storing the character-image data converted by the image-data-generating means; and image-forming means for reading the character-image data from the image-data-storing means and forming the control information list including the number-of-sheets-used-information on the image-recording medium as an image based on the character-image data on the image-recording medium, wherein the image-forming means has a function for printing out the control information list including the number-of-sheets-used-information on the image-recording medium by at least one of coloring and character-modifying the specific-device information under a specific condition.

9. An image-forming device according to claim 8, further comprising a user interface for displaying a condition to be set by the condition-setting module when printing out the control information list including the number-of-sheets-used-information on the image-recording medium.

10. An image-forming device according to claim 8, wherein the image-forming means has a function for printing out the above character-image data by at least one of coloring and modifying the character-image data in accordance with preset conditions when printing out the control information list including the number-of-sheets-used-information on the image-recording medium.

11. An image-forming device according to claim 8, wherein the image-data-generating means has a function for determining whether an item designated by a user meets a condition designated by the user when generating the control information list including the number-of-sheets-used-information on the image-recording medium every user group and when the item meets the condition, generating the character-image data by at least one of coloring the character-image data with a color designated by the user and applying character-string modification to the character-image data in accordance with a modification method designated by the user, and the image-forming means image-forming means has a function for printing out the the control information list including the number-of-sheets-used-information on the image-recording medium generated by the image-data-generating means by at least one of coloring the character-image data with a color designated by the user or applying character-string modification to the character-image data in accordance with a modification method designated by the user.

12. An image-forming device according to claim 8, wherein the image-data-generating means has a function for generating character-image data by applying respectively-inherent character modification to the specific machine-control information under a plurality of conditions, and the image-forming means has a function for printing out the control information list including the number-of-sheets-used-information on the image-recording medium by applying respectively-inherent character modification to the specific machine-control information generated by the image-data-generating means under a plurality of conditions.

13. An image-forming device according to claim 8, wherein the image-forming means has a function for printing out the the control information list including the number-of-sheets-used-information on the image-recording medium by stepwise coloring the character-image data with a respectively-inherent color in accordance with a plurality of preset conditions about one item, when printing out the control information list including the number-of-sheets-used-information on the image-recording medium.

14. An image-forming device according to claim 8, wherein the image-data-generating means has a function for determining whether a plurality of threshold levels is met for each of a plurality of conditions designated by a user about one item designated by the user when generating the control information list including the number-of-sheet-used-information and generating character-image data by coloring the character-image data with a color designated by the user in accordance with a the plurality of threshold levels meeting each of the plurality of conditions, and the image-forming means has a function for printing out the character-image data by coloring the character image data with a color designated by the user in accordance with the threshold levels meeting each of the plurality of conditions.

15. A method for controlling an image-forming device, comprising:

holding a control information list including the number-of-sheets-used-information on an image-recording medium as specific machine-control information to be held by the image-forming device;

setting a reference value for the specific machine-control information as a condition;

fetching the machine-control information, determining whether the machine-control information meets the above condition, adding predetermined color information to the machine-control information in accordance with the determination result, and converting the machine-control information including the predetermined color information into character-string data when printing out the control information list including the number-of-sheets-used-information on the image-recording medium;

converting the character-string data into character-image data;

storing the character-image data in a memory; and reading character-image data from the memory and forming the control information list including the number-of-sheets-used-information on the image-recording medium as an image based on the character-image data on the image-recording medium, wherein the image formation is performed by applying at least one of coloring and character modification to the specific device information under a specific condition and printing out data.

16. A method for controlling an image-forming device according to claim 15, wherein the image formation is performed by printing out the character-image data by at least one of coloring and modifying the character-image data in accordance with a preset condition when printing out the specific-device information.

17. A method for controlling an image-forming device according to claim 15, wherein the image-data generation is performed by determining whether an item designated by a user meets a condition designated by the user when generating the control information list including the number-of-sheets-used-information, and generating character-image data by at least one of coloring the data with a color designated by the user and applying character-string modification to the character-image data in accordance with a modification method designated by the user when meeting the condition, and the image formation is performed by printing out character-image data generated by coloring the data with a color designated by the user or applying character-string modification to the data by a modification method designated by the user.

18. A method for controlling an image-forming device according to claim 15, wherein the image-data generation is performed by generating character-image data by applying respectively-inherent character modification to the specific machine-control information under a plurality of conditions, and the image formation is performed by printing out the control information list including the number-of-sheets-used-information on the image-recording medium generated by applying respectively-inherent character modification to the character-image data under a plurality of conditions.

19. A method for controlling an image-forming device according to claim 15, wherein the image formation is performed by printing out the the control information list including the number-of-sheets-used-information on the image-recording medium by stepwise coloring the data with a respectively-inherent color in accordance with a plurality of preset conditions, when printing out the control information list including the number-of-sheets-used-information on the image-recording medium.

20. A method for controlling an image-forming device according to claim 15, wherein the image-data generation is performed by determining whether a plurality of threshold levels is met for each of a plurality of conditions designated by a user about an item designated by the user when generating the control information list including the number-of-sheets-used-information and generates character-image data by coloring the character-image data with a color designated by the user in accordance with the plurality of threshold levels meeting each of the plurality of conditions, and the image formation is performed by printing out the character-image data generated by coloring the character-image data with a color designated by the user in accordance with the threshold levels meeting each of the plurality of conditions.

* * * * *